US012562764B2

(12) United States Patent
Cao et al.

(10) Patent No.: US 12,562,764 B2
(45) Date of Patent: Feb. 24, 2026

(54) MILLIMETER WAVE DIGITAL PREDISTORTION CALIBRATION

(71) Applicant: QUALCOMM Incorporated, San Diego, CA (US)

(72) Inventors: Damin Cao, San Diego, CA (US); Shrenik Patel, San Diego, CA (US); Igor Gutman, Hod HaSharon (IL); Carl Hardin, Encinitas, CA (US); Varadarajan Kachii Kadambi, San Diego, CA (US); Siddharth Kamath, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 18/323,286

(22) Filed: May 24, 2023

(65) Prior Publication Data

US 2024/0396578 A1     Nov. 28, 2024

(51) Int. Cl.
| | |
|---|---|
| *H04B 1/04* | (2006.01) |
| *H04B 17/12* | (2015.01) |
| *H04L 27/36* | (2006.01) |

(52) U.S. Cl.
CPC ........... *H04B 1/0475* (2013.01); *H04B 17/12* (2015.01); *H04L 27/367* (2013.01); *H04B 2001/0425* (2013.01)

(58) Field of Classification Search
CPC ...... H04B 1/0475; H04B 17/12; H04B 17/13; H04B 17/21; H04B 2001/0425; H04L 27/367
See application file for complete search history.

(56) References Cited

U.S. PATENT DOCUMENTS

| | | | | |
|---|---|---|---|---|
| 2019/0089389 A1* | 3/2019 | Gutman | ..................... | H03F 3/24 |
| 2020/0336117 A1* | 10/2020 | Li | .............................. | H03F 3/24 |

FOREIGN PATENT DOCUMENTS

WO     WO-2024084629 A1 *   4/2024   ......... H03F 1/3294

* cited by examiner

Primary Examiner — Siu M Lee
(74) Attorney, Agent, or Firm — Polsinelli/Qualcomm Incorporated

(57) ABSTRACT

Aspects described herein include devices and methods for facilitating digital predistortion calibration. One aspect includes selecting a first transmission element from a plurality of transmission elements associated with a first antenna element of a plurality of antenna elements in an antenna array of the millimeter wave communication device, wherein the first transmission element is selected based on a gain setting for the first transmission element, selecting a reference transmission power for a test transmission from the first transmission element as part of a path searching operation of the millimeter wave communication device, determining a selected receive element of the plurality of receive elements based on a near field power measurement of the reference transmission power from the first transmission element using the selected receive element and a set of selection criteria, and setting a digital predistortion calibration setting using the reference transmission power and the near field power measurement.

30 Claims, 16 Drawing Sheets

1x8 array on a
Module

1x8 array on a Module

1x6 array on a Module

1100

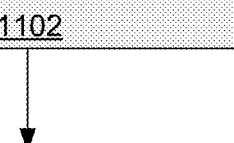

START

Select, a first transmission element from a plurality of transmission elements associated with a first antenna element of a plurality of antenna elements in an antenna array of the millimeter wave communication device, wherein the first transmission element is selected based on a gain setting for the first transmission element

1102

Select a reference transmission power for a test transmission from the first transmission element as part of a path searching operation of the millimeter wave communication device

1104

Determine a selected receive element of the plurality of receive elements based on a near field power measurement of the reference transmission power from the first transmission element using the selected receive element and a set of selection criteria

1106

Set a digital predistortion calibration setting using the reference transmission power and the near field power measurement

1108

END

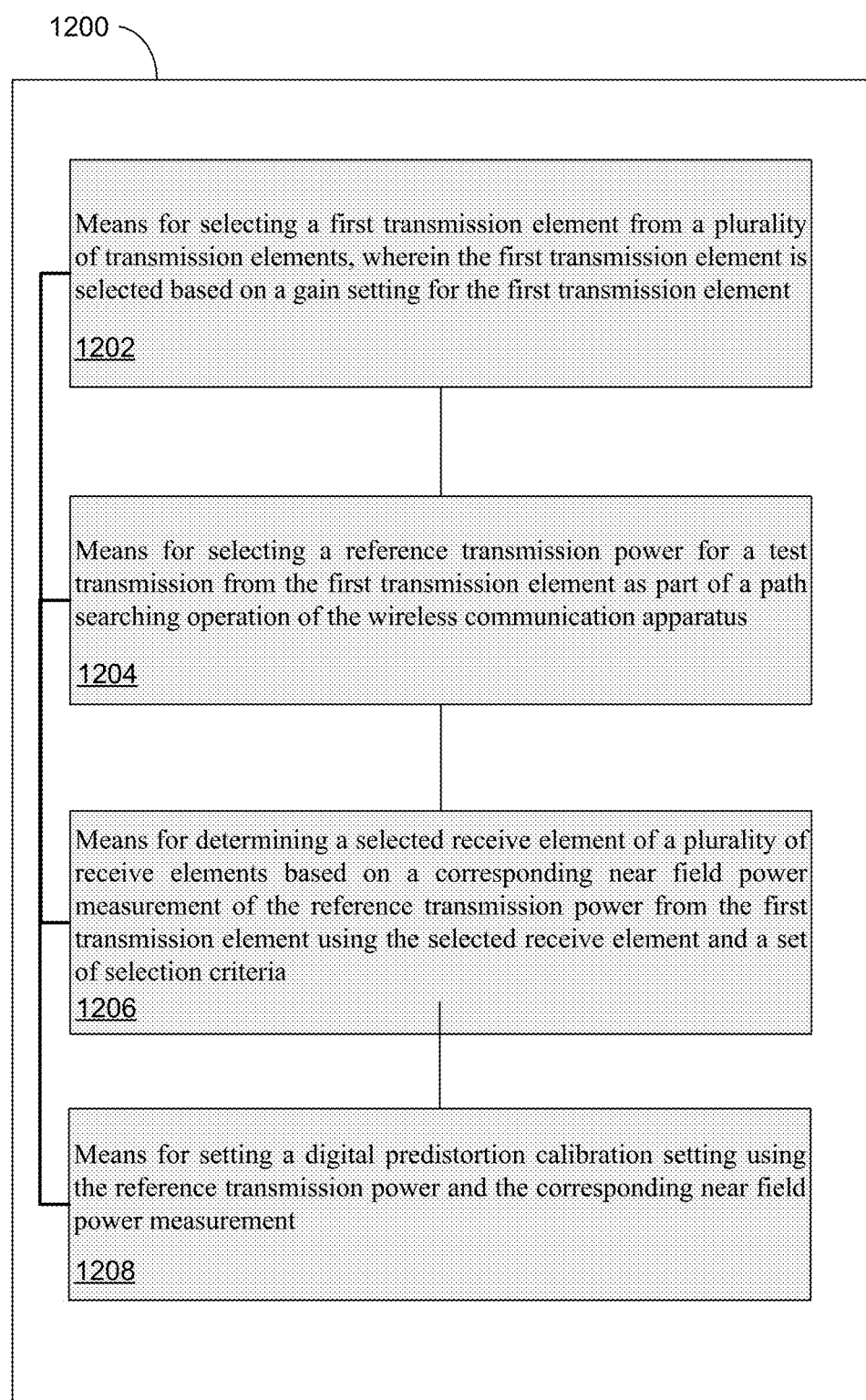

Means for selecting a first transmission element from a plurality of transmission elements, wherein the first transmission element is selected based on a gain setting for the first transmission element

1202

Means for selecting a reference transmission power for a test transmission from the first transmission element as part of a path searching operation of the wireless communication apparatus

1204

Means for determining a selected receive element of a plurality of receive elements based on a corresponding near field power measurement of the reference transmission power from the first transmission element using the selected receive element and a set of selection criteria
1206

Means for setting a digital predistortion calibration setting using the reference transmission power and the corresponding near field power measurement
1208

*FIG. 12*

MILLIMETER WAVE DIGITAL PREDISTORTION CALIBRATION

FIELD

The present disclosure relates generally to electronics and wireless communications. For example, aspects of the present disclosure relate to millimeter wave (mmW) communications, and calibration of mmW communication systems.

BACKGROUND

Wireless communication devices and technologies are becoming ever more prevalent. Wireless communication devices generally transmit and receive communication signals. A communication signal is typically processed by a variety of different components and circuits. In some modern communication systems, phase array antennas are used to improve system operation with improved link budgets, system capacity, beamforming, multiple-in multiple-out (MIMO) communications, and other such system operation. Supporting such systems can involve complex system design choices, and managing complex interactions among device elements and signals.

SUMMARY

Various implementations of systems, methods, and devices within the scope of the appended claims each have several aspects, no single one of which is solely responsible for the desirable attributes described herein. Without limiting the scope of the appended claims, some prominent features are described herein.

Aspects described herein include devices, wireless communication apparatuses, circuits, and modules supporting wireless communications, particularly at millimeter wave frequencies.

One aspect is a millimeter wave communication device. The device an antenna array comprising a plurality of antenna elements; a plurality of transmission elements, where each transmission element is coupled to a corresponding antenna element of the plurality of antenna elements; a plurality of receive elements, where each receive element is coupled to an associated antenna element of the plurality of antenna elements; and control circuitry coupled to the plurality of transmission elements and the plurality of receive elements, the control circuitry configurable to perform operations including: selecting, at the millimeter wave communication device, a first transmission element from the plurality of transmission elements, where the first transmission element is selected based on a gain setting for the first transmission element; selecting a reference transmission power for a test transmission from the first transmission element as part of a path searching operation of the millimeter wave communication device; determining a selected receive element of the plurality of receive elements based on a corresponding near field power measurement of the reference transmission power from the first transmission element using the selected receive element and a set of selection criteria; and setting a digital predistortion calibration setting using the reference transmission power and the corresponding near field power measurement.

In some aspects, such a millimeter wave communication device can further include one or more processors; a memory coupled to the one or more processors; and a modem coupled to the one or more processors, where the modem comprises the control circuitry.

Another aspect is a computer readable storage medium. The computer readable storage medium comprising instructions that, when executed by control circuitry of a millimeter wave communication device, causes the millimeter wave communication device to perform operations comprising: selecting, at the millimeter wave communication device, a first transmission element from a plurality of transmission elements, where the first transmission element is selected based on a gain setting for the first transmission element; selecting a reference transmission power for a test transmission from the first transmission element as part of a path searching operation of the millimeter wave communication device; determining a selected receive element of the plurality of receive elements based on a corresponding near field power measurement of the reference transmission power from the first transmission element using the selected receive element and a set of selection criteria; and setting a digital predistortion calibration setting using the reference transmission power and the corresponding near field power measurement.

Another aspect is a wireless communication apparatus. The wireless communication apparatus comprises means for selecting a first transmission element from a plurality of transmission elements, where the first transmission element is selected based on a gain setting for the first transmission element; means for selecting a reference transmission power for a test transmission from the first transmission element as part of a path searching operation of the wireless communication apparatus; means for determining a selected receive element of a plurality of receive elements based on a corresponding near field power measurement of the reference transmission power from the first transmission element using the selected receive element and a set of selection criteria; and means for setting a digital predistortion calibration setting using the reference transmission power and the corresponding near field power measurement.

In some aspects, such an apparatus further includes means for storing the digital predistortion calibration setting; means for generating a millimeter wave transmission signal; means for predistorting the millimeter wave transmission signal to generate a predistorted millimeter wave transmission signal; and means for transmitting the predistorted millimeter wave transmission signal.

Another aspect is a method. The method includes selecting, at a millimeter wave communication device, a first transmission element from a plurality of transmission elements associated with a first antenna element of a plurality of antenna elements in an antenna array of the millimeter wave communication device, where the first transmission element is selected based on a gain setting for the first transmission element, and where the millimeter wave communication device comprises the plurality of antenna elements, the plurality of transmission elements coupled to the plurality of antenna elements, and a plurality of receive elements coupled to the plurality of antenna elements; selecting a reference transmission power for a test transmission from the first transmission element as part of a path searching operation of the millimeter wave communication device; determining a selected receive element of the plurality of receive elements based on a near field power measurement of the reference transmission power from the first transmission element using the selected receive element and a set of selection criteria; and setting a digital predistortion calibration setting using the reference transmission power and the near field power measurement.

Some aspects operate where the digital predistortion calibration setting is further based on a transmission value which is the reference transmission power plus a target transmission power, and a receive power offset value which is a difference between the near field power measurement at the selected receive element and a target receive element power.

Some aspects operate where the set of selection criteria comprises a threshold range and a target power value. Some such aspects operate where determining the selected receive element comprises determining whether a corresponding near field power measurement for any of the plurality of receive elements is within the threshold range. Some such aspects operate where determining the selected receive element comprises selecting the selected receive element with a highest value for the corresponding near field power measurement when no corresponding near field power measurement for any of the plurality of receive elements are within the threshold range. Some such aspects operate where determining the selected receive element comprises selecting the selected receive element with a closest value to the target power value when multiple corresponding near field power measurements are within the threshold range.

Some aspects operate where the reference transmission power is a medium power setting more than a threshold value away from a minimum power setting and a maximum power setting.

Some aspects operate where a corresponding near field power measurement for each of the plurality of receive elements, including the near field power measurement for the selected receive element, is a wide band energy estimator (WBEE) value.

Some aspects further include storing the digital predistortion calibration setting in a memory of a modem; and predistorting a transmission signal generated by the modem using the digital predistortion calibration setting.

Some such aspects operate where the gain setting used to select the first transmission element is an intermediate gain setting that avoids poor antenna loading associated with minimum or maximum gain settings. Some such aspects operate where the gain setting is a medium gain setting relative to maximum and or minimum gain settings for the plurality of antenna elements.

Some aspects further include performing a transmission amplitude mismatch calibration for each element of the plurality of transmission elements; and selecting the first transmission element using results of the transmission amplitude mismatch calibration. Some such aspects operate where the transmission amplitude mismatch calibration comprises: configuring each transmission element of the plurality of transmission elements with a standard gain setting; and measuring an output power for each transmission element of the plurality of transmission elements.

Some such aspects operate where the selected receive element is selected by: selecting a reference gain state for the plurality of receive elements associated with the plurality of antenna elements in the antenna array other than the first antenna element; and measuring a corresponding near field power measurement for each of the plurality of receive elements from a transmission via the first transmission element using the reference transmission power.

Some aspects further include performing a near field loopback test using the first transmission element and the selected receive element configured with the digital predistortion calibration setting to generate transmission predistortion settings using a modem of the millimeter wave communication device.

Some such aspects further include generating a transmission signal; modifying the transmission signal using the digital transmission predistortion settings; and transmitting the transmission signal using the antenna array.

Some such aspects further include selecting an initial transmission element based on a gain setting for the initial transmission element; selecting the reference transmission power for an initial test transmission from the initial transmission element as part of the path searching operation of the millimeter wave communication device; determining that no receive element of the plurality of receive elements meets a measurement threshold based on near field power measurements of the reference transmission power from the initial transmission element; and selecting the transmission element after determining that no receive element of the plurality of receive elements meets the measurement threshold.

In some aspects, the apparatuses described above can function in a system that includes a mobile device with a camera for capturing one or more pictures. In some aspects, the apparatuses described above can include a display screen for displaying one or more images or interface displays. In some aspects, additional wireless communication circuitry is provided. The summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and embodiments, will become more apparent upon referring to the following specification, claims, and accompanying drawings.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 11 is a flow chart describing an example of the operation of a method for signal amplification.

FIG. 12 is a functional block diagram of an apparatus for signal amplification.

DETAILED DESCRIPTION

Figure 1:
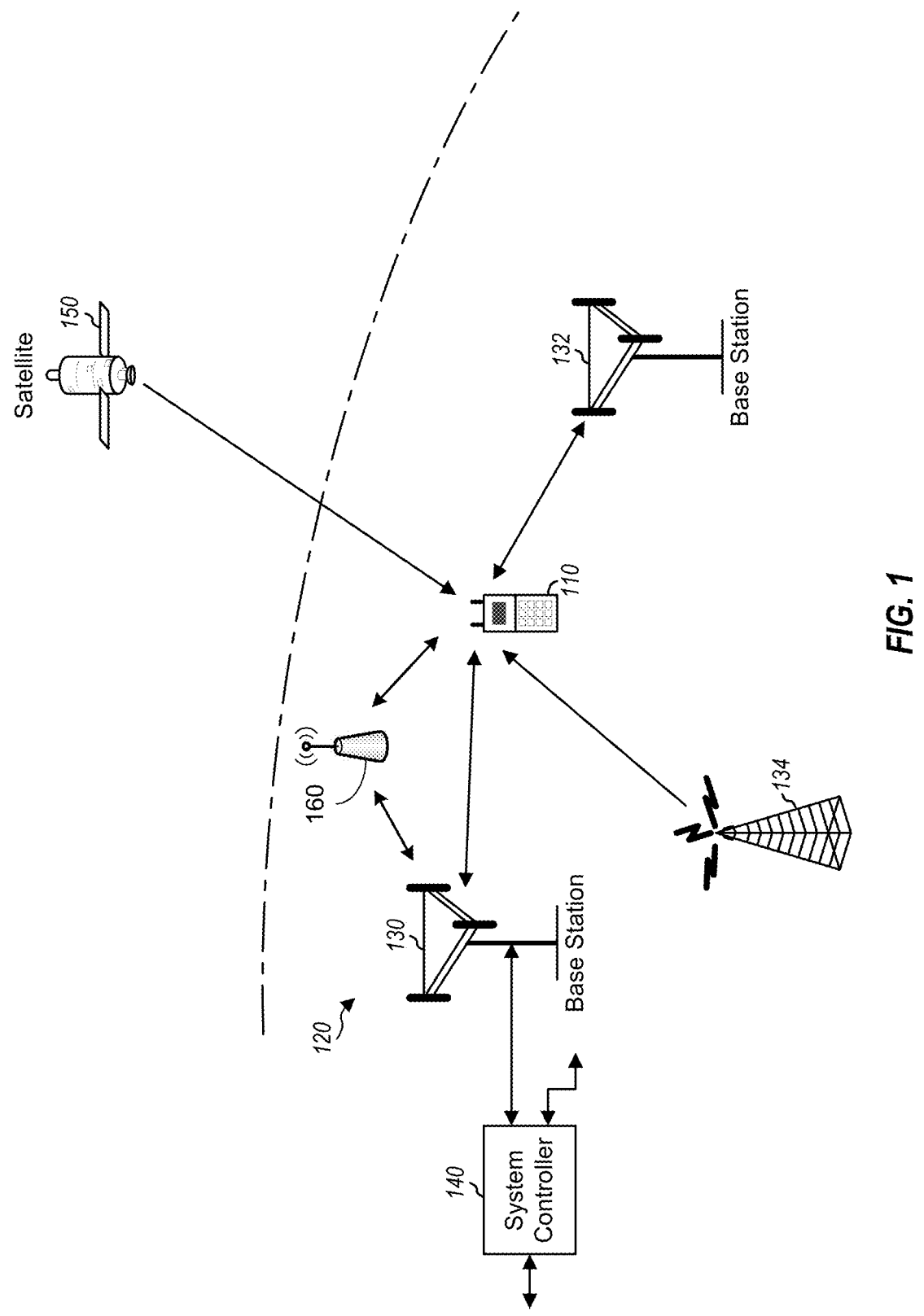
FIG. 1 is a diagram showing a wireless communication system communicating with a wireless device that can be implemented according to aspects described herein.

The detailed description set forth below in connection with the appended drawings is intended as a description of example aspects and implementations and is not intended to represent the only implementations in which the invention may be practiced. The detailed description includes specific details for the purpose of providing a thorough understanding of the example aspects and implementations. In some instances, some devices are shown in block diagram form. Drawing elements that are common among the following figures may be identified using the same reference numerals.

The progression of wireless communication infrastructure, such as for Third Generation Partnership Project (3GPP) fifth generation (5G) millimeter wavelength (mmW) systems and 5G standards for cellular communications involve increasing complexity of frequency combinations and communication throughput options. Calibration of mmW elements to meet performance targets of mmW operations often relies on self-calibration because of the large cost of independent test equipment, due to measurement uncertainty associated with over-the-air radiation based mmW measurements, and due to lack of test access to antenna connectors.

Digital predistortion (DPD) calibration involves signal processing with a path for a loopback TX signal so that a modem can process samples captured for DPD training. Some feedback receivers (FBRx) can be designed to loopback a transmission (Tx) signal to receive (Rx) elements in sub-6 GHz frequencies, but such FBRx increases device costs and size. Further, a mmW FBRx may be particularly costly due to the need for each power amplifier in a mmW beam forming array including a separate FBRx path for effective testing.

Aspects described herein include training path searching and/or selecting operations (e.g., a training path searching and/or selecting algorithm) as an alternative solution to FBRx options to provide end-to-end signal path measurements for DPD calibration. The described training path searching provides functionality to support DPD at a significantly lower cost and space usage at mmW frequencies when compared to alternative systems including FBRx to support DPD calibration, improving the operation of a device by providing similar performance with less space usage and few circuit elements.

Further details regarding aspects described herein are provided with respect to the figures below.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a medical device, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS), etc.). Wireless device 110 may support one or more radio technologies for wireless communication such as LTE, WCDMA, CDMA 1X, EVDO, TD-SCDMA, GSM, 802.11, 5G, communications with a non-terrestrial network, etc. The wireless device 110 may additionally include millimeter wave (mmW) communication elements for transmitting and receiving signals using mmW wireless signals. Such mmW communication elements can be part of mmW modules as described in FIGS. 10A-D and can include mmW communication circuitry as described in FIGS. 2A-C, 5, 6, and 7. Aspects described herein include operations and systems for calibration of digital pre-distortion systems in such mmW communication elements in wireless devices such as the wireless device 110.

The wireless communication system 120 may also include a wireless device 160. In some aspects, the wireless device 160 may be a wireless access point, or another wireless communication device that comprises, or comprises part of a wireless local area network (WLAN). In an exemplary embodiment, the wireless device 160 may be referred to as a customer premises equipment (CPE), which may be in communication with a base station 130 and a wireless device 110, or other devices in the wireless communication system 120. In some embodiments, the CPE may be configured to communicate with the wireless device 110 using WAN signaling and to interface with the base station 130 based on such communication instead of the wireless device 110 directly communicating with the base station 130. In exemplary embodiments where the wireless device 160 is configured to communicate using WLAN signaling, a WLAN signal may include WiFi, or other communication signals.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies. Wireless device 110 may also be capable of communicating directly with other wireless devices without communicating through a network.

In general, carrier aggregation (CA) may be categorized into two types-intra-band CA and inter-band CA. Intra-band CA refers to operation on multiple carriers within the same band. Inter-band CA refers to operation on multiple carriers in different bands.

Figure 2A:
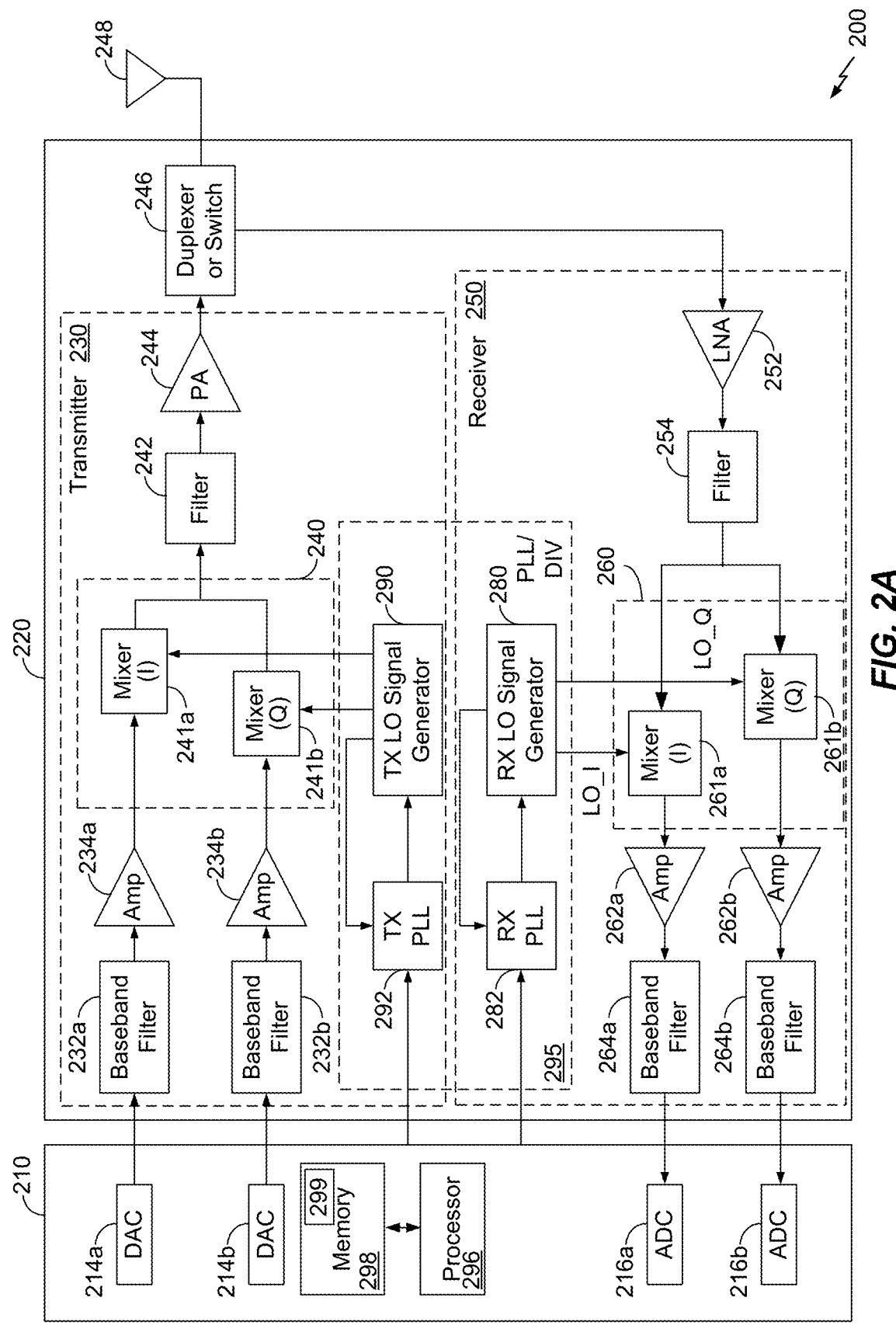
FIG. 2A is a block diagram showing a wireless device in which exemplary techniques of the present disclosure may be implemented.

FIG. 2A is a block diagram showing a wireless device 200 in which the exemplary techniques of the present disclosure may be implemented. The wireless device 200 may, for example, be an embodiment of the wireless device 110 illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214*a* and 214*b* for converting digital signals generated by the data processor 210 into the I and Q analog output signals, e.g., I and Q output currents, for further processing. In other embodiments, the DACs 214*a* and 214*b* are included in the transceiver 220 and the data processor 210 provides data (e.g., for I and Q) to the transceiver 220 digitally.

Within the transmitter 230, lowpass filters 232*a* and 232*b* filter the I and Q analog transmit signals, respectively, to remove undesired images caused by the prior digital-to-analog conversion. Amplifiers (Amp) 234*a* and 234*b* amplify the signals from lowpass filters 232*a* and 232*b*, respectively, and provide I and Q baseband signals. An upconverter 240 having upconversion mixers 241*a* and 241*b* upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier (PA) 244 amplifies the signal from filter 242 to obtain the desired output power level and provides a transmit RF signal. The transmit RF signal is routed through a duplexer or switch 246 and transmitted via an antenna array 248. While examples discussed herein utilize I and Q signals, those of skill in the art will understand that components of the transceiver may be configured to utilize polar modulation.

In the receive path, the antenna array 248 receives communication signals and provides a received RF signal, which is routed through duplexer or switch 246 and provided to a low noise amplifier (LNA) 252. The duplexer or switch 246 is designed to operate with a specific RX-to-TX duplexer frequency separation, such that RX signals are isolated from TX signals. The received RF signal is amplified by LNA 252 and filtered by a filter 254 to obtain a desired RF input signal. Downconversion mixers 261*a* and 261*b* in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262*a* and 262*b* and further filtered by lowpass filters 264*a* and 264*b* to obtain I and Q analog input signals, which are provided to data processor 210. In the exemplary embodiment shown, the data processor 210 includes analog-to-digital-converters (ADCs) 216*a* and 216*b* for converting the analog input signals into digital signals to be further processed by the data processor 210. In some embodiments, the ADCs 216*a* and 216*b* are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

In an exemplary embodiment, the RX PLL 282, the TX PLL 292, the RX LO signal generator 280, and the TX LO signal generator 290 may alternatively be combined into a single LO generator circuit 295, which may include common or shared LO signal generator circuitry to provide the TX LO signals and the RX LO signals. Alternatively, separate LO generator circuits may be used to generate the TX LO signals and the RX LO signals.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the duplexer or switch 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the filter 242, PA 244, LNA 252 and filter 254 may be implemented separately from other components in the transmitter 230 and receiver 250, and may be implemented on a millimeter wave integrated circuit. An example super-heterodyne architecture is illustrated in FIG. 2B.

Figure 2B:
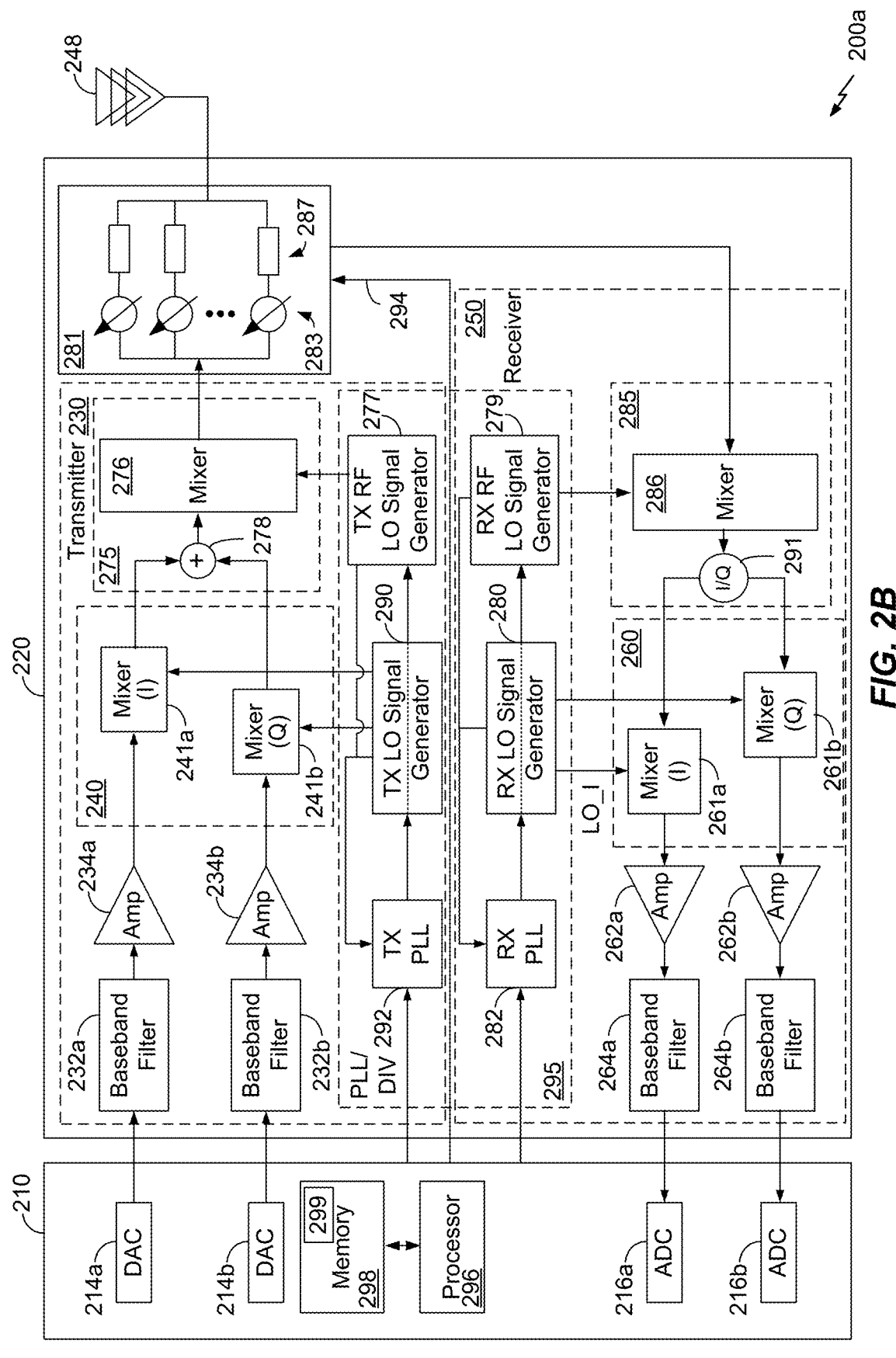
FIG. 2B is a block diagram showing a wireless device in which exemplary techniques of the present disclosure may be implemented.

FIG. 2B is a block diagram showing a wireless device in which the exemplary techniques of the present disclosure may be implemented. Certain components, for example which may be indicated by identical reference numerals, of the wireless device 200a in FIG. 2B may be configured similarly to those in the wireless device 200 shown in FIG. 2A and the description of identically numbered items in FIG. 2B will not be repeated.

The wireless device 200a is an example of a heterodyne (or superheterodyne) architecture in which the upconverter 240 and the downconverter 260 are configured to process a communication signal between baseband and an intermediate frequency (IF). For example, the upconverter 240 may be configured to provide an IF signal to an upconverter 275. In an exemplary embodiment, the upconverter 275 may comprise summing function 278 and upconversion mixer 276. The summing function 278 combines the I and the Q outputs of the upconverter 240 and provides a non-quadrature signal to the mixer 276. The non-quadrature signal may be single ended or differential. The mixer 276 is configured to receive the IF signal from the upconverter 240 and TX RF LO signals from a TX RF LO signal generator 277, and provide an upconverted RF signal to phase shift circuitry 281. While PLL 292 is illustrated in FIG. 2B as being shared by the signal generators 290, 277, a respective PLL for each signal generator may be implemented.

Components in the phase shift circuitry 281 may comprise one or more adjustable or variable phased array elements, and may receive one or more control signals from the data processor 210 over connection 294 and operate the adjustable or variable phased array elements based on the received control signals.

The phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287.

Each phase shifter 283 may be configured to receive the RF transmit signal from the upconverter 275, alter the phase by an amount, and provide the RF signal to a respective phased array element 287. Each phased array element 287 may comprise transmit and receive circuitry including one or more filters, amplifiers, driver amplifiers, and power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise an I/Q generation function 291 and a downconversion mixer 286. In an exemplary embodiment, the mixer 286 downconverts the receive RF signal provided by the phase shift circuitry 281 to an IF signal according to RX RF LO signals provided by an RX RF LO signal generator 279. The I/Q generation function 291 receives the IF signal from the mixer 286 and generates I and Q signals for the downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect. For example, components of the antenna array 248 may be implemented on a substrate and coupled to an integrated circuit implementing the phase shift circuitry 281 via a flexible printed circuit.

In some embodiments, both the architecture illustrated in FIG. 2A and the architecture illustrated in FIG. 2B are implemented in the same device. For example, a wireless device 110 or 200 may be configured to communicate with signals having a frequency below about 10 GHz using the architecture illustrated in FIG. 2A and to communicate with signals having a frequency above about 10 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from RF and signals that have been downconverted from RF to baseband via an IF stage may be filtered by the same baseband filter (e.g., the filter 264a,264b). In other embodiments, a first version of the filter is included in the portion of the device which implements the architecture of FIG. 2A and a second version of the filter is included in the portion of the device which implements the architecture of FIG. 2B. In some examples, phase shift circuitry is implemented in a direct conversion architecture, for example by omitting the upconverter 240 and the downconverter 260.

Figure 2C:
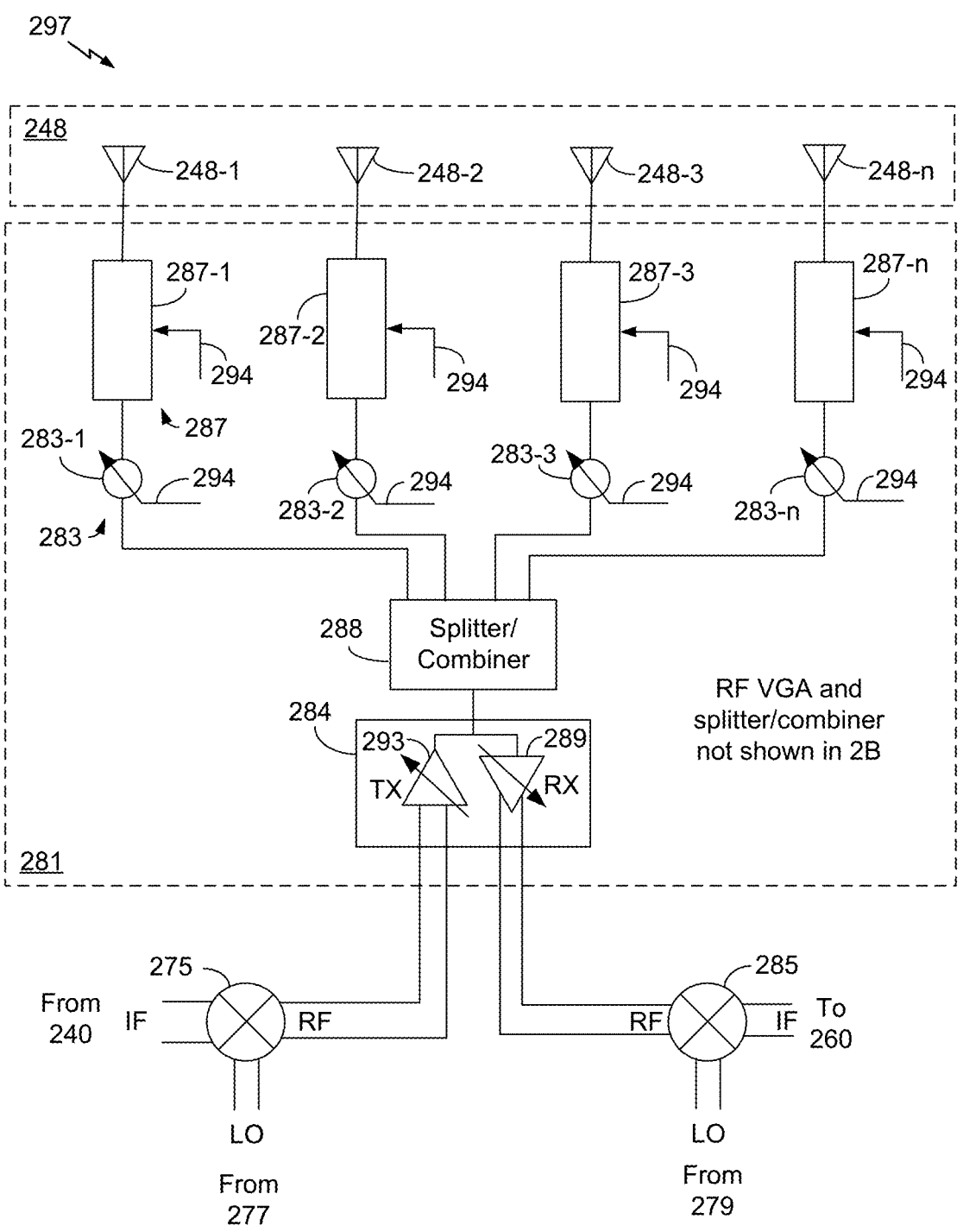
FIG. 2C is a block diagram showing in greater detail some of the components of FIG. 2B.

FIG. 2C is a block diagram 297 showing in greater detail an embodiment of some of the components of FIG. 2B. In an exemplary embodiment, the upconverter 275 provides an RF transmit signal to the phase shift circuitry 281 and the downconverter 285 receives an RF receive signal from the phase shift circuitry 281. In an exemplary embodiment, the phase shift circuitry 281 comprises an RF variable gain amplifier 284, a splitter/combiner 288, the phase shifters 283 and the phased array elements 287. In an exemplary embodiment, the phase shift circuitry 281 may be implemented on a millimeter-wave integrated circuit (mmWIC). In some such embodiments, the upconverter 275 and/or the downconverter 285 (or just the mixers 276, 286) are also implemented on the mmWIC. In an exemplary embodiment, the RF VGA 284 may comprise a TX VGA 293 and an RX VGA 289. In some embodiments, the TX VGA 293 and the RX VGA 289 may be implemented independently. In other embodiments, the VGA 284 is bidirectional. In an exemplary embodiment, the splitter/combiner 288 may be an example of a power distribution network and a power combining network. In some embodiments, the splitter/combiner 288 may be implemented as a single component or as a separate signal splitter and signal combiner. The phase shifters 283 are coupled to respective phased array elements 287. Each respective phased array element 287 is coupled to a respective antenna element in the antenna array 248. In some examples, multiple phased array elements 287 are coupled to each of the antenna elements in the antenna array 248, for example such that each antenna element can operate in a plurality of polarizations. In an exemplary embodiment, phase shifters 283 and the phased array elements 287 receive control signals from the data processor 210 over connection 294. The exemplary embodiment shown in FIG. 2C comprises a 1×4 array having four phase shifters 283-1, 283-2, 283-3 and 283-n, four phased array elements 287-1, 287-2, 287-3 and 287-n, and four antennas 248-1, 248-2, 248-3 and 248-n. However, a 1×4 phased array is shown for example only, and other configurations, such as 1×2, 1×6, 1×8, 2×3, 2×4, or other configurations are possible. Each phased array element 287 can include transmit and receive circuitry (not illustrated). Each of the phase shifters 283 may be shared by the transmit and receive circuitry of a respective phased array element, or respective phase shifters for transmit and receive functions may be implemented for each of the phased array elements 287. Further, while the phase shifters 283 are illustrated as being signal path phase shifters, other examples include LO-path phase shifting, for example when respective mixers for each phased array element 287 are implemented.

Transmission and receive paths involved in transmitting and receiving mmW signals via phased array elements and antennas such as the antennas 248-1 through 248-n can introduce signal distortion associated with system non-linearity.

Figure 3:
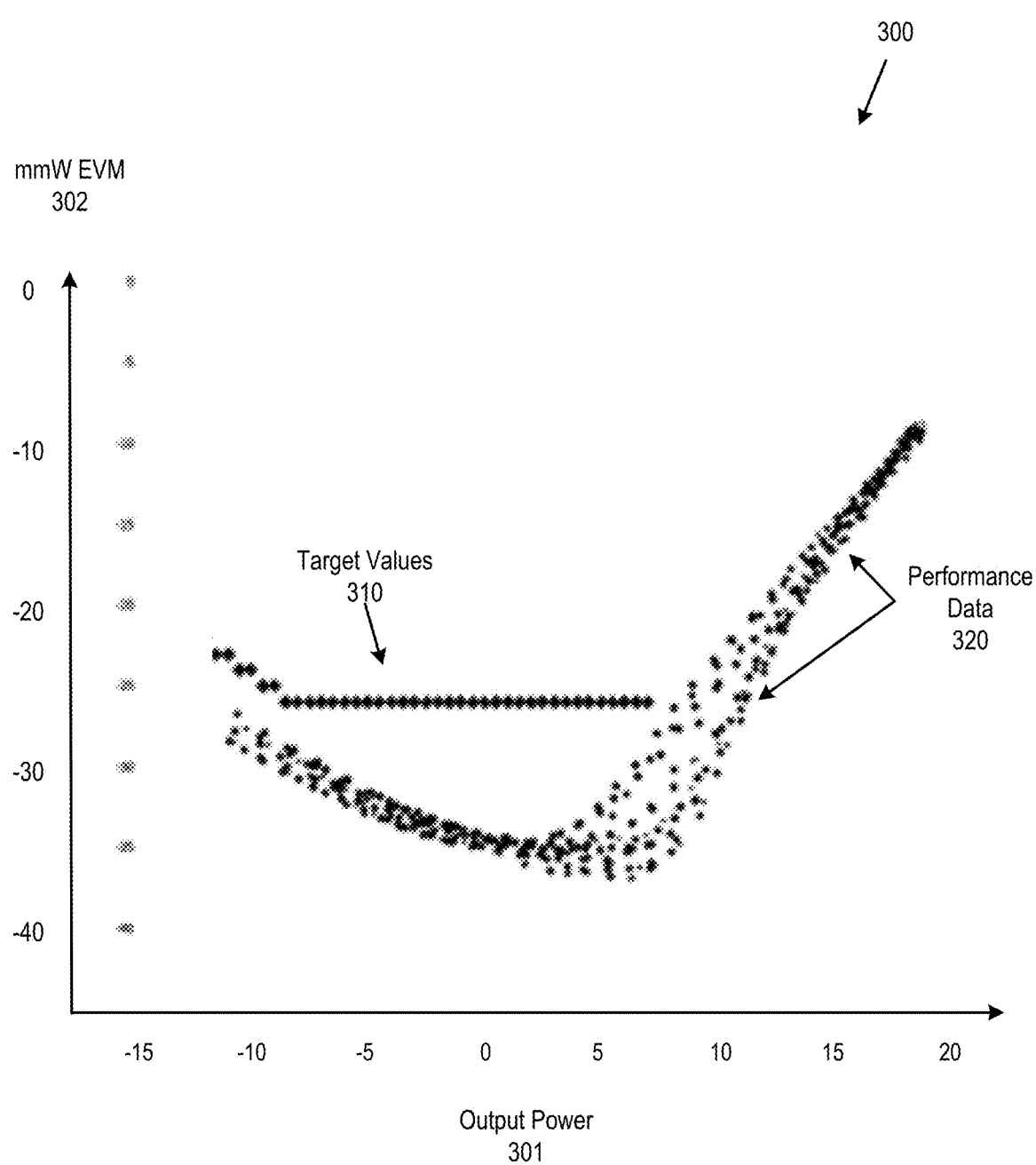
FIG. 3 is a chart showing aspects of mmW communication device performance with predistortion calibration in accordance with aspects described herein.
Figure 4:
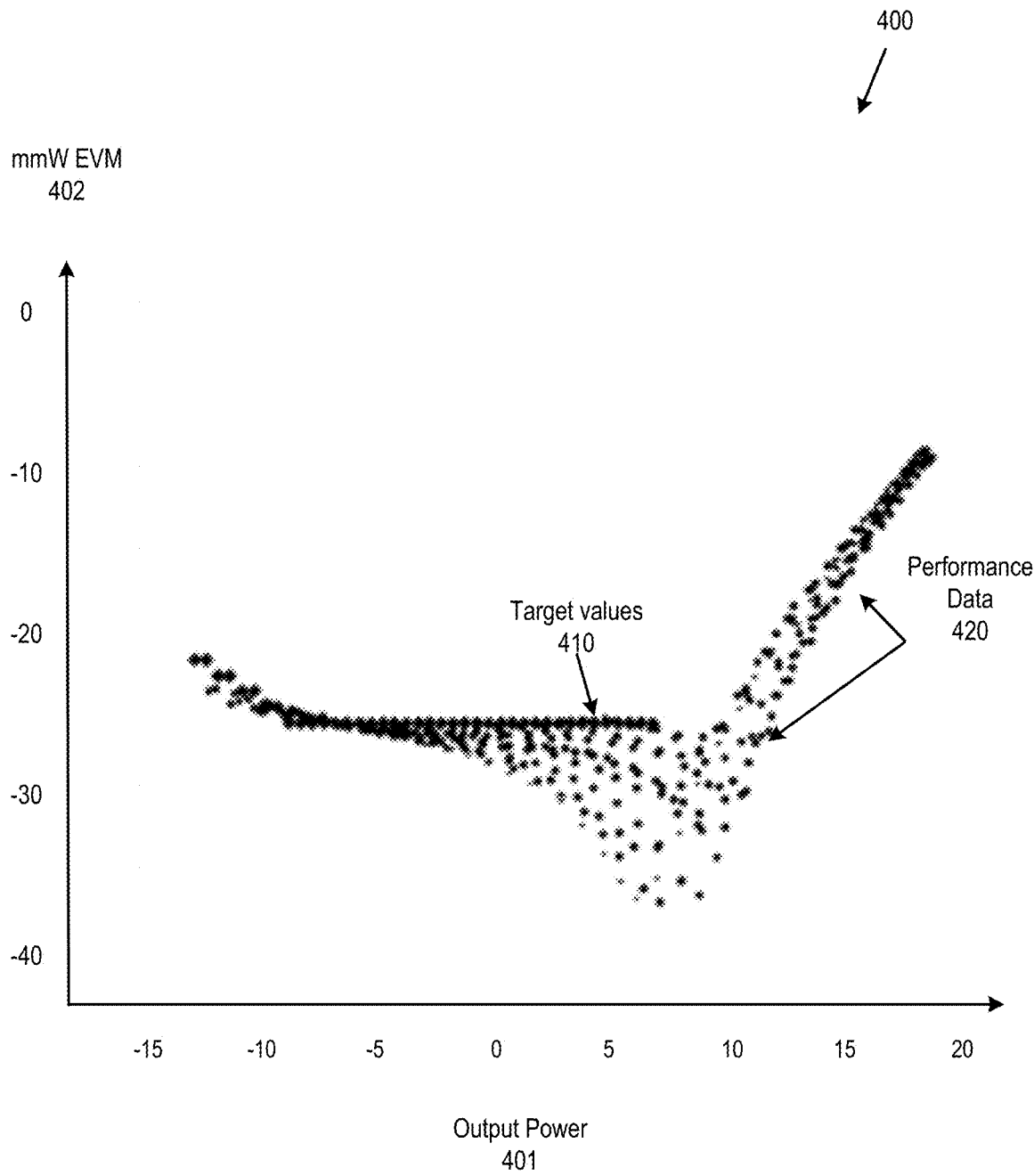
FIG. 4 is a chart showing aspects of mmW communication device performance without predistortion calibration in accordance with aspects described herein.

FIG. 3 is a chart showing aspects of mmW communication device performance with digital predistortion calibration trained with medium or nominal antenna loading in accordance with aspects described herein. FIG. 4 is a chart showing aspects of mmW communication device performance with digital predistortion calibration trained under poor loading conditions in accordance with aspects described herein. Transmission non-linearity is associated with antenna loading. Compensating for a single transmission element with poor quality antenna loading results in poor device performance as illustrated in FIG. 4, where compensation with medium or nominal antenna loading results in positive results, as reflected in FIG. 3. FIGS. 3 and 4 illustrate charts of error vector magnitude (EVM) values in decibels (dB) for a device with good antenna loading (e.g., FIG. 3) associated with good device performance, and bad antenna loading (e.g., FIG. 4) associated with poor device performance. EVM is a system level performance characteristic used in many communications standards, including LTE and 5G standards discussed above. EVM is determined by finding an ideal constellation location for received symbols, and calculating error vector magnitudes between received symbol locations and the closest ideal constellation locations.

As detailed herein, mmW devices include multiple antenna loading options. Aspects described herein include training path searching algorithms that avoid selecting bad antenna loading options for DPD training by identifying and selecting gain elements for DPD training which provide good antenna loading (e.g., antenna loading which provides improved EVM values under test).

Chart 300 of FIG. 3 includes mmW communication settings to select the output power 301 (e.g., Pbump, an output power at the bump) on the x-axis, and the corresponding mmW EVM 302 values on the y-axis. In FIG. 3, the x-axis reflects output power for different antenna loading (e.g., communication setting) values. MmW EVM 302 axis represents EVM values for a given value of the antenna load at a given output power. The performance data 320 reflects individual values for a given antenna load and output power 301 value. Target values 310 illustrate a threshold performance for an example design, with target EVM values for a given output power targeted to remain below the target values 310 for all antenna loads. An example target value or threshold in one implementation, for example, can be −26 decibels (dB). In other aspects or implementations, other target values can be used, and such target values or thresholds can vary from design to design based on operating conditions and device performance targets.

A given antenna load will result in a curve of output power 301 values and associated mmW EVM 302 values. The performance data 320 includes data points for an example design at multiple antenna loads, resulting in multiple curves such that a given output power 301 value will have different mmW EVM 302 values associated with the different antenna loads The performance data 320 illustrates EVM performance for a variety of operational settings (e.g., associated antenna loads) using predistortion calibration with loading values selected in accordance with aspects described herein. As can be seen in FIG. 3, the performance data 320 provides a fairly consistent curve of EVM values for given performance settings, which can result in predistortion calibration compensating for the EVM values. The range of antenna loads that can provide "good" performance (e.g., performance where the mmW EVM 302 values are below the target values) will vary for different device designs.

Chart 400 of FIG. 4 is a chart similar to chart 300 of FIG. 3, representing "bad" antenna loading. The chart 400 includes output power 401 values on the x-axis, and the corresponding mmW EVM 402 values on the y-axis as described above for FIG. 3. Target values 410 are also similar to target values 310 discussed above, and describe performance targets for maximum allowable mmW EVM values. Performance data 420 illustrates EVM performance for a variety of operational settings with "poor" antenna loading using predistortion calibration with loading values selected in accordance with aspects described herein. As can be seen in FIG. 4, particularly when compared with the performance data 320 of FIG. 3, the performance data 420 does not provide a consistent curve of EVM values for given performance settings, and includes EVM values above the target values associated with ineffective predistortion calibration compensating for the EVM values.

Figure 5:
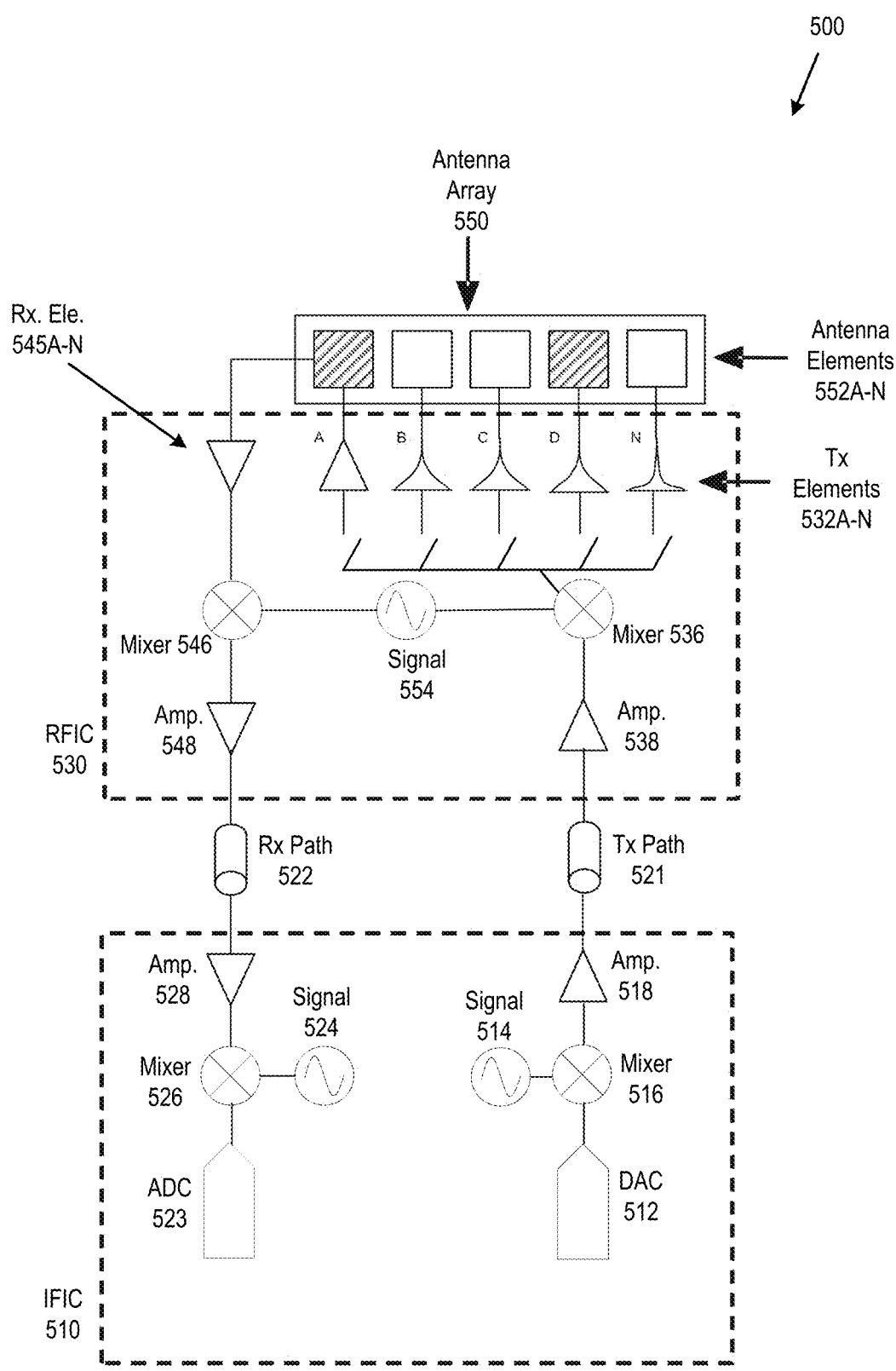
FIG. 5 illustrates aspects of a mmW communication device involved with predistortion calibration in accordance with aspects described herein.

FIG. 5 illustrates aspects of a mmW communication device 500 involved with predistortion calibration in accordance with aspects described herein. The mmW communication device includes an antenna array 550 (e.g., which may be similar to the antenna array 248 and/or the array included in the mmW RF module 1000 of FIGS. 10A-D), a radio frequency integrated circuit (RFIC) 530, and an intermediate frequency integrated circuitry (IFIC) 510. The IFIC 510 is communicatively coupled to other circuitry (e.g., the data processor 210, for example a modem) to receive digital data at an input 501 of the digital-to-analog converter (DAC) 512 (which may be an example of the DAC 214) for transmission and to provide received data via the analog-to-digital converter (ADC) 523 (which may be an example of the ADC 216). Digital data received at the DAC 512 is upconverted to an intermediate frequency using signal 514 (e.g., an IF mixing signal) with a mixer 516 (which may be an example of the upconverter 240), and then amplified using amplifier 518 for communication to the RFIC 530 via the transmission path 521. At the RFIC 530, the intermediate frequency transmission signal is received at the amplifier 538, amplified, and then upconverted to the communication frequency using the signal 554 and the mixer 536 (which may be an example of the mixer 276). Different Tx elements 532A-N connect the mmW frequency transmission signal to respective antennas in the antenna array 550. The use of A-N labeling, without illustrating all letters between A and N, is meant to represent the possible inclusion of an arbitrary number of elements. In some aspects, 8 Tx elements 532 can be present. In other aspects, the Tx elements 532 can include any number of elements (e.g., any positive integer number) suitable for a given design. In some aspects, each of the Tx elements 532A-N may include a phase shifter, a power amplifier, and a connection to a different element of the antenna elements 552A-N, and may be an example of a portion of a phased array element 287.

In FIG. 5, a representative receive path is shown with a single Rx element used to represent Rx elements 545A-N is shown. Each of the antenna elements 552A-N will have an associated Rx element of the Rx elements 545A-N (e.g., amplification circuitry, which may be included in a phased array element 287) set to receive a wireless signal. FIG. 5 additionally illustrates mixer 546 (which may be an example of the mixer 286) used with the signal 554 to down convert the receive signal, amplifier 548, Rx path 522, and amplifier 528 to provide the received signal to the IFIC 510. At the IFIC 510, the intermediate signal (e.g., downconverted from the communication frequency by the mixer 546) is down-converted by mixer 526 (which may be an example of the downconverter 260) and the signal 524 to a baseband frequency, and then converted to a digital signal by the ADC 523 to be provided at output 502 to additional portions of a device. In other examples, direct conversion is implemented.

Figure 7:
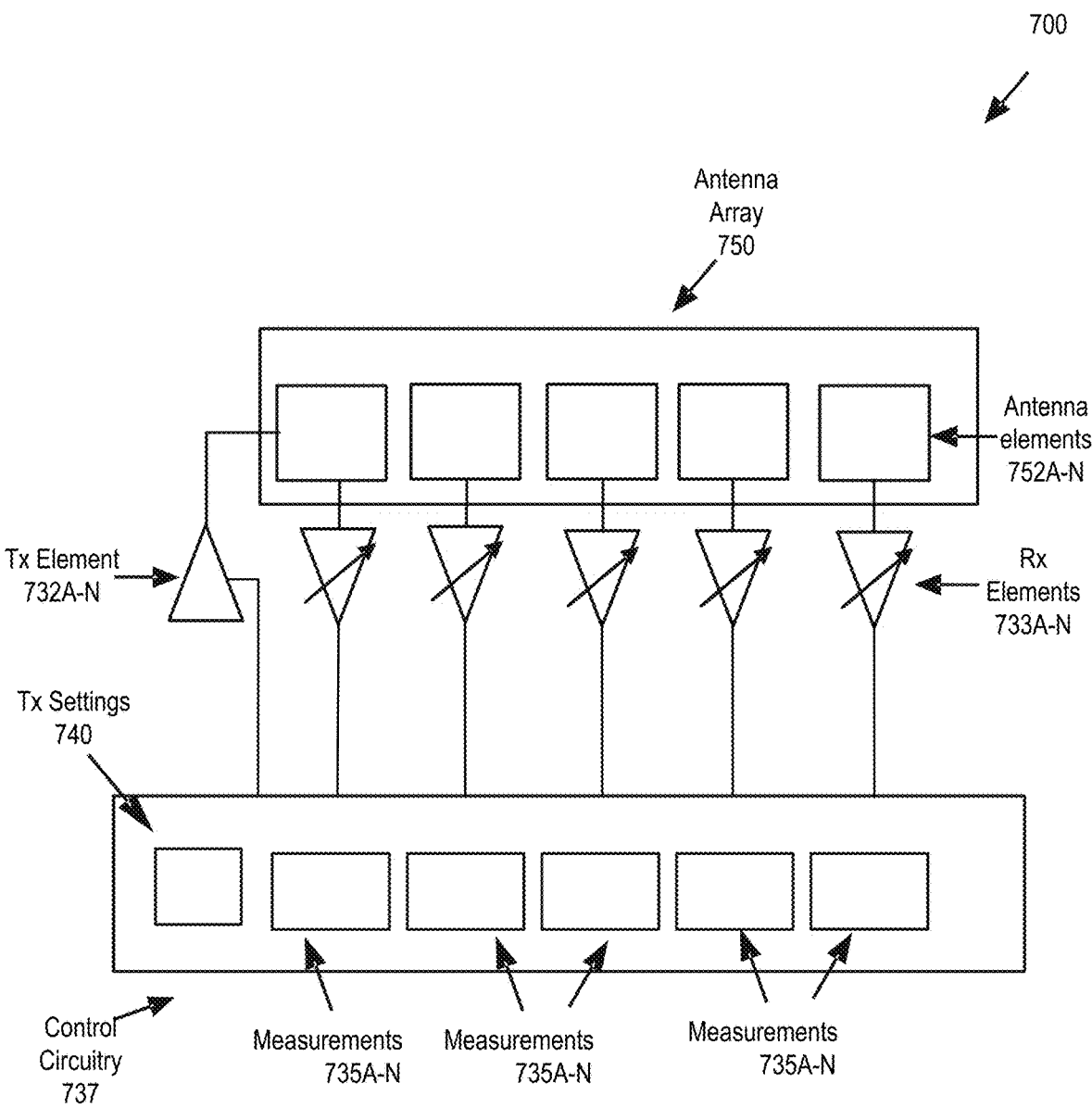
FIG. 7 illustrates aspects of a mmW communication device involved with predistortion calibration in accordance with aspects described herein.

As indicated above, the antenna loading of the different Tx elements 552A-N can have non-linearities as a function of the individual antenna loading. As described in detail below, use of a medium gain Tx element combined with Rx element selection can identify a signal path for near field mutual coupling that provides loopback data with acceptable performance to replace FBRx hardware for DPD training. FIG. 5 illustrates multiple Tx elements 532A-N with a representative Rx element representing the Rx elements 545A-N for case of illustration, but as illustrated in FIG. 7, multiple Rx elements are present. As shown, the different Tx elements 532A-N are illustrated differently, with the combinations of elements making up each Tx element 532 (e.g., separate phase shifters, power amplifiers, connectors, etc., for each of the Tx elements 532A, 532B. 532C, 532D, 532N, etc.) having different associated antenna loading values. Tx element 532A is illustrated as being different than Tx element 532N, which are both different than Tx elements 532B. 532C, and 532D. As detailed herein, certain loading values, (e.g., as illustrated by the outlier representations of the Tx element 532A and the Tx element 532N) fail to meet target criteria (e.g., provide performance data that exceed target values as illustrated by the performance data 420 exceeding the target values 410 in FIG. 4), while intermediate or moderate loading values, as represented by the Tx elements 532B-D, meet target criteria (e.g., provide performance data that is less than a target values, as illustrated by the performance data 320 that is below the target values 310 of FIG. 3.

During calibration, a given combination of Tx and Rx paths can be tested to identify loading values for different paths that meet target values, or that provide preferred performance as measured against provided performance criteria as described herein.

Further, as described above, each antenna element can operate with a given polarization (e.g., to transmit or receive wireless signals associated with a given polarization. In some aspects, transmission can occur on antenna elements with a first polarization, and reception can occur on a second polarization different from the first polarization. In other aspects, transmission and reception can occur on antenna elements with a same polarization.

Figure 6:
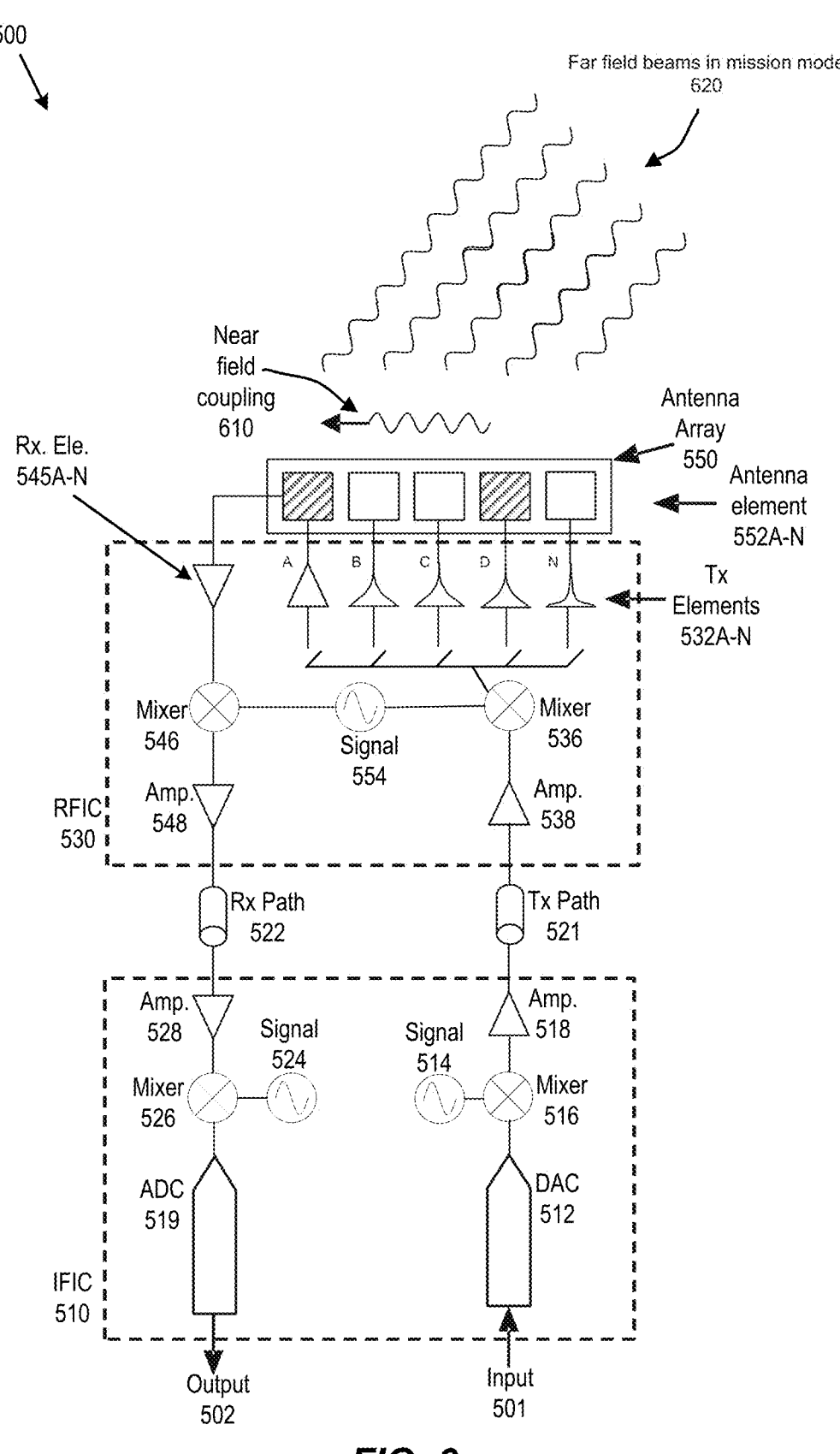
FIG. 6 illustrates aspects of a mmW communication device involved with predistortion calibration in accordance with aspects described herein.

FIG. 6 illustrates aspects of the mmW communication device 500 involved with predistortion calibration in accordance with aspects described herein. FIG. 5 includes the same details of the mmW communication device 500 in the IFIC 510 and the RFIC 530, with the addition of operational details of wireless signals operating over the air. In particular, during communications with another device, far field beams in mission mode 620 will be transmitted to and from the antenna array 550 using the mmW frequencies that the device 500 is configured for. The digital predistortion calibration and the training path operations described herein, however, relate to loopback over the air communications and measurements using near field coupling 610 between different elements 552A-N of the antenna array 550.

As indicated above, each antenna element 552A-N will have associated Tx elements 532A-N and Rx elements 545A-N. For simplicity, only antenna element 552A is shown as associated with both an Rx element and Tx element. Each of the antenna elements 552A-N, however, will have associated Tx elements and Rx elements (e.g., pairs of Tx elements 532A-N and Rx elements 545A-N). During near field coupling 610, an antenna element is selected for transmission, with the associated Tx element, and a different antenna element of the antenna array 550 is selected with the associated Rx element. Such a selection is performed as described above, by taking measurements for different combinations of Tx and Rx paths (e.g., having different associated antenna loading values.) In the example of FIG. 6, antenna element 552D is selected for transmission and antenna element 552A is selected for reception. Because of the physical proximity of the antenna element 552D and the antenna element 552A, the amplification of the selected Rx element of Rx elements 545A-N can be set to a very low level, which will prevent far field beams (e.g., from other devices or other noise signals outside the system) that are incident upon the antenna array 550 during calibration measurements from having a significant impact on the measurements. The Rx gain can then be adjusted based on the Tx signal from the near field coupling 610

Figure 8:
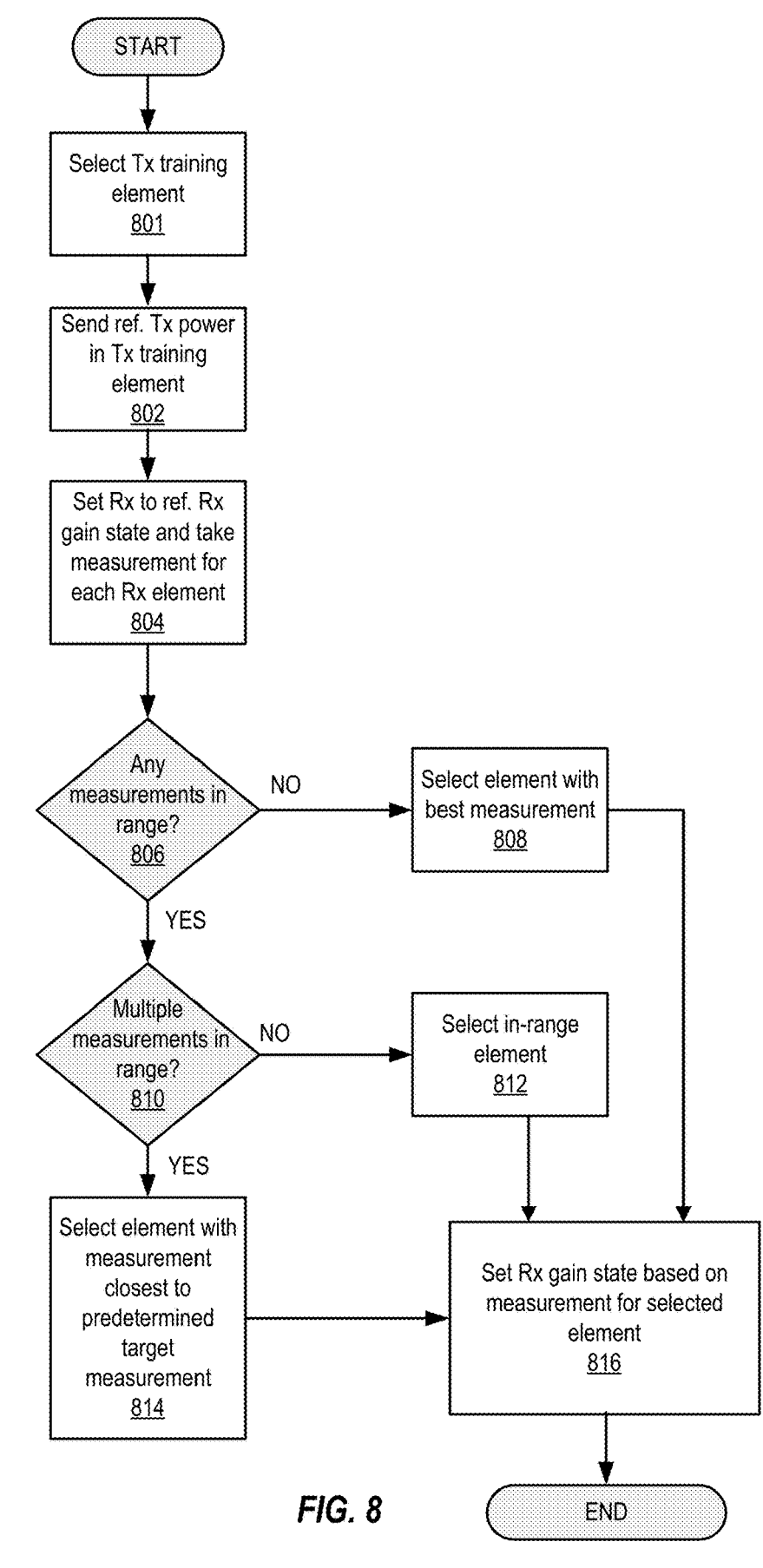
FIG. 8 is a flow diagram illustrating a method in accordance with aspects of the present disclosure.

The near field coupling 610 is not only a function of a distance between a selected Tx element and a selected Rx element, but is also a function of operating frequency, antenna design, and housing and packaging structure for a device. The described training path searching for mmW digital predistortion calibration determines an Rx gain state that gives a selected Rx signal to noise ratio (SNR) based on a mutual coupling level of a selected Rx element and Tx element. The combination of the selected Rx element from the path searching (e.g., as illustrated by the example of FIG. 8) provides a gain state and an operating point for a loopback path used in digital predistortion calibration. With the operating point and gain state from the path search, the near field coupling 610 in combination with existing elements of the TX and RX paths in the phased array elements 287 can replace a separate hardware FBRx in predistortion calibration operations, reducing the size and cost of a mmW device while maintaining testable performance of the device. Additional details of near field coupling 610 operation for calibration in accordance with aspects described herein are discussed below.

FIG. 7 illustrates aspects of a mmW communication device 700 involved with predistortion calibration in accordance with aspects described herein. The mmW communication device 700 can be the same device as the communication device 500, with the Rx elements 733A-N illustrated in FIG. 7 that are part of the communication device 500, but not all illustrated in FIGS. 5 and 6 (e.g., the Rx elements 545A-N). As mentioned above, FIGS. 5 and 6 only show a single Rx element representing the Rx elements 545A-N attached to antenna element 552A, but each antenna element 552A-N will have an associated Rx element similar to the Rx elements 733A-N of FIG. 7. Thus, the Rx elements illustrated as a single element in FIGS. 5 and 6 may be similar to the Rx elements 733A-N explicitly illustrated in FIG. 7, with a single Rx element selected for operation based on calibration as described herein.

Similarly, FIGS. 5 and 6 illustrate Tx elements 532A-N, and FIG. 7 only illustrates a single Tx element to represent Tx elements 732A-N. (e.g., similar to the Tx elements 532A-N described above). The mmW communication device 700 will have an associated Tx element 732A-N for each of the antenna elements 752A-N, but these are not shown for simplicity and to emphasize the operations of path searching for mmW digital predistortion calibration in accordance with aspects herein (e.g., described in more detail in FIGS. 8 and 11). While FIGS. 5 and 6 show a single representative Rx element, and FIG. 7 shows a single representative Tx element, aspects can include Rx and Tx elements for each of the illustrated antenna elements.

FIG. 7 further illustrates that control circuitry 737 of the mmW communication device 700 (e.g., control circuitry of a modem or a data processor such as the data processor 210) will have memory and control settings to select test states and store measurement data for path searching for mmW digital predistortion calibration in accordance with aspects herein. FIG. 7 illustrates Tx settings 740 for the Tx elements 732A-N, and measurements 735A-N for the Rx elements 733A-N that are used in selecting Rx gain state settings (e.g., gain settings for the Rx elements 733A-N) for digital predistortion calibration.

FIG. 8 is a flow diagram illustrating a method 800 in accordance with aspects of the present disclosure. In some aspects, the operations of the method 800 can be performed by control circuitry and elements of a mmW communication device as described herein. In some aspects, the operations of the method 800 can be implemented as instructions (e.g., 299) stored in a computer readable storage medium (e.g., memory 298) that, when executed by processing or control circuitry of a device (e.g., processor 296), cause the device to perform the described operations. The blocks in the method 800 can be performed in or out of the order shown, and in some embodiments, can be performed at least in part in parallel.

The method 800 includes block 801, which involves selecting a Tx element from a plurality of Tx elements associated with antenna elements of an antenna array (e.g., the Tx elements 732A-N associated with antenna elements 752A-N of the antenna array 750, or the Tx elements 545A-N associated with the antenna elements 552A-N of the antenna array 550). In some aspects, selection of the Tx element (e.g., to select a medium gain element as described above) can use the results of a prior calibration. In some aspects, such a calibration can be a Tx amplitude mismatch calibration. The Tx amplitude mismatch calibration can include setting a same gain or operating setting for each Tx element of the plurality of Tx elements. An output power can then be measured for each of the plurality of Tx elements. The output power can be used to identify gain calibration settings for each of the Tx elements, and can allow relative consideration of the gain properties of each Tx element (e.g., high, low, medium, etc.) The selected Tx element, as described above, is a Tx element with an intermediate gain setting for an expected reference Tx power, in order to avoid "bad" antenna loading associated with minimum or maximum gain settings, and to select for the relatively "good" antenna loading associated with the intermediate gain setting of the selected Tx element.

In some aspects, an AMAM/AMPM sample capture can be used to determine the selected Tx element. In some aspects, beam capture measurements can be used to identify the selected Tx element. In some aspects, the goal of DPD is to improve the EIRP for a beam generated by multiple antenna elements and the associated multiple Tx elements (e.g., generating a beam using phase shifted Tx signals and the plurality of Tx elements associated with the antenna elements). Selection of the Tx element can use a single element that provides the most similar operation to priority beam combinations (e.g., Tx element combinations for certain transmission beams). The gain setting can provide a simple approximation for a similar Tx element, rather than the time consuming operation of beam capture measurements for each Tx element.

In some aspects, multiple Tx elements can fall within an intermediate gain setting. In such aspects, a Tx element with a gain closest to a center setting can be selected, secondary criteria, such as association with an antenna element in a preferred position or other secondary criteria can be used, or the Tx element can be selected randomly from the suitable Tx elements. As described below, if no Rx path is found to result in an acceptable Tx-Rx loopback path for a given initially selected Tx element, the method 800 can repeat from the block 801 with selection of an additional Tx element, until an acceptable Tx-Rx loopback path combination is found, or until all suitable elements have been tested. In some aspects, a repeat limit can be used to avoid excess testing time and power (e.g., a limit of 2 or 3 repetitions of the blocks 801 through 812, etc.)

The method 800 includes block 802, which involves sending a reference Tx power to a selected Tx training element. As described above, aspects herein include devices with antenna arrays having a plurality of antenna elements, and each antenna element can be associated with Tx elements and Rx elements. The Tx elements can have performance variations, and gain settings that can be adjusted to compensate for performance variations. During device training as described herein, the training can be performed using a selected Tx element (e.g., rather than training each combination of elements independently). Selection of the Tx element can impact the quality of the training as described. Gain settings for a Tx element are correlated with non-linearity. By avoiding Tx elements that use maximum or minimum gain settings (e.g., selecting a Tx element with a medium Tx gain setting), bad antenna loading for training is avoided.

A medium Tx gain element can be selected to avoid problematic antenna loading, as selection of a medium Tx gain limits non-linearity, which is a strong function of antenna loading, and can result in poor EVM results, as illustrated in FIGS. 3 and 4. In a system where Tx gain elements have maximum and minimum gain settings, a medium setting can be a central setting, a setting which is within a threshold distance of a median setting, or a setting which is a threshold value away from a minimum power setting or a maximum power setting. Gain is correlated with amplitude-amplitude (AMAM) characteristics which determines non-linearity. By avoiding gain values near the maximum or minimum gain (e.g., by selecting a medium Tx gain), problematic antenna loading for DPD training is avoided. Further, during far field beams in mission mode 620 operation, the power amplifiers and associated Tx paths for Tx elements 532A-N are beam-forming. The non-linearity of the combined beams from Tx elements 532A-N operating together for beamforming results in the non-linearities from the different power amplifiers of the Tx paths and Tx elements 532A-N being summed and blending as part of the far field beams in mission mode 620. Selection of a single medium gain Tx element effectively represents the blended non-linearity of the Tx paths operating together for beamforming when the signals (e.g., and the associated non-linearities) are blended together in the far field as far field beams in mission mode 620.

The method 800 includes block 804, which involves selecting an Rx reference gain state, and taking measurements for each Rx path. In the example of FIG. 7, a same Rx gain state is selected for each of the Rx element 733A-N from the control circuitry of the mmW communication device 700. The Tx settings from block 802 result in a Tx transmission from the selected Tx element, and near field coupling (e.g., the near field coupling 610) with the other antenna elements. During measurement, the gain for each Rx path is set to detect the signal from the selected Tx element (e.g., via the near field coupling 610), which will result in any far field beams (e.g., noise sources or beams from other nearby devices) having a minimal impact on the measurement. The measurements can be wide band energy estimator (WBEE) values, or any form of power measurement or energy estimate for the Rx paths based on the selected Tx signal from block 802. The measurements are then stored (e.g., in memory associated with measurements 735A-N using control circuitry of a modem or processor, such as the control circuitry 737).

The method 800 includes decision block 806, which involves determining if any of the stored measurements from block 804 are within a threshold range (e.g., between a low working range and a high working range stored in control circuitry). If any of the stored measurements are within the threshold range, the method 800 proceeds to block 810. If none of the corresponding near field power measurements for the Rx elements are within the threshold range, the method proceeds to block 808.

The method 800 includes block 808. In block 808, when no measurements from the block 804 are within the threshold range, then a value (e.g., a best or closest value) from among the measurements is selected. In some aspects, the selection criteria when no measurement is within the threshold range involves selecting the measurement with the highest estimated energy or the highest power value. In other aspects, the selected value can be the value closest to the threshold range mathematically (e.g., a smallest magnitude from the selected value to either the high or low value of the threshold range), or any other secondary selection criteria.

The method 800 includes decision block 810, which involves determining if multiple measurements are within the threshold range. If only a single measurement is within the threshold range, then in block 812, the single measurement is selected. If multiple measurements are within the range, then in block 814 a secondary target value is compared with the in range measurements to determine a best value. Just as above in block 808, the selected value can be the value closest to the secondary target value, or any other such secondary criteria.

The method 800 includes block 816, which involves setting the predistortion calibration Rx gain state to the identified Rx value. As described above, the Tx settings from block 802 and the selected Rx gain state from block 816 result in an identified operating point that can be used for over the air loopback measurement with near field coupling during subsequent DPD training. In some aspects, the identified operating point is stored as a digital predistortion calibration setting. The digital predistortion calibration setting can be a transmission value based on the reference transmission power and a target transmission power, and a receive power offset value which is the corresponding near field power measurement of the selected receive element plus a target receive element power. For example, if the near field power measurements for each of the Rx elements is a WBEE measurement, the digital predistortion calibration setting can be an Rx gain state identified as the reference transmission power setting of block 802 plus a target power setting value, plus the difference between the WBEE measurement and a target WBEE value. The target transmission power compensates for the higher power used in communicating a far field signal to another device as compared to the near field power used during the digital predistortion calibration. The target receive element power is an expected mid-device operating value to reduce non-linearity modified by the identified Rx power (e.g., the WBEE measurement for the selected device or any other such power or energy measurement) determined during calibration searching in accordance with aspects described herein.

The identified operating points are used during the over the air loopback testing to detect distortions in the transmission signal and the received signal in operating (e.g., mission or communication mode) conditions. Detection of the distortions allows for digital predistortion of transmissions to improve the linearity and EVM characteristics of a device.

As described, the selection and configuration of a Tx element in blocks 801 and 802, and the selection of a matching Rx element in blocks 804 through 814, identify a path that can be used as a loopback bath for DPD calibration. After this path is identified, the Rx element settings identified during the path selection are set and used during the DPD calibration operations.

In some aspects, threshold criteria or acceptable measurements can be identified for path searching. If no Rx element is identified for the initially selected Tx element, one or more additional Tx elements can be selected, essentially performing operations of blocks 801 through 814 in a loop if no acceptable Rx path is identified in the block 814. Any number of Tx elements can be tested this way, and any Tx element that has a matching Rx element that meets performance criteria can be used. If no combination of Tx and Rx elements meets the device criteria, the DPD calibration is aborted, and the device can operate without the benefits of DPD calibration.

Following the operations of the block 814, the information from these measurements of the method 800 are then used by a device modem (e.g., with the near field loopback data passed to the modem via a receive path ADC such as the ADC 519) for predistortion calibration. During operation, the Tx signals passed to the device DAC (e.g., the DAC 512) at the input 501 will include predistortion used to improve performance in accordance with aspects described herein.

The predistortion calibration can have threshold limits on the measurements (e.g., an acceptable range for the search path measurements of the block 812), and if the digital predistortion exceeds these limits or are identified as suboptimal or out of range, the digital predistortion calibration can be aborted, as an indication that the expected benefits of digital predistortion cannot be achieved for the characteristics of the Tx and Rx elements in the mmW communication device. The device can then operate without the benefits of digital predistortion.

Figure 9A:
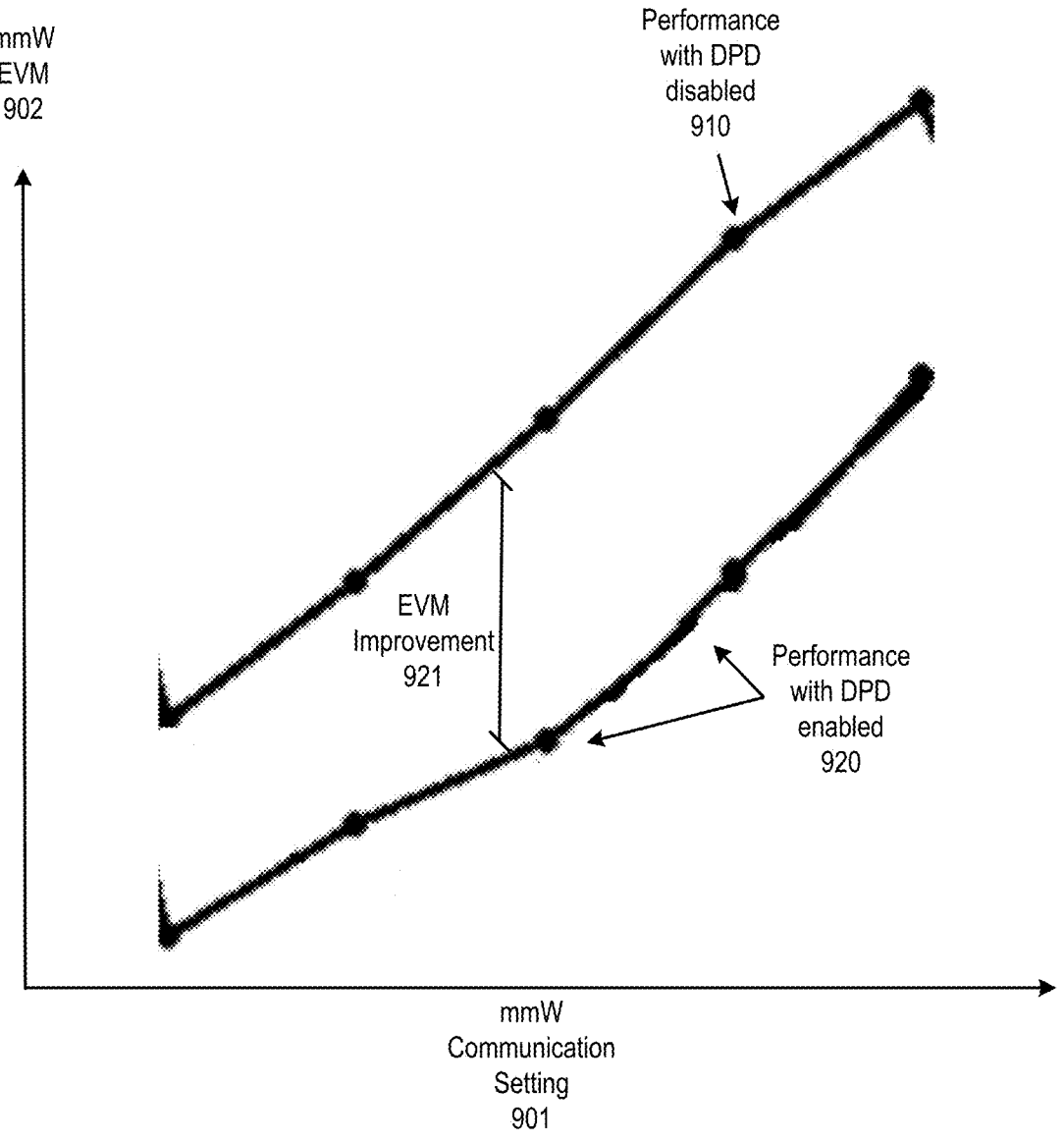
FIG. 9A is a chart showing aspects of mmW communication device performance in accordance with aspects described herein.
Figure 9B:
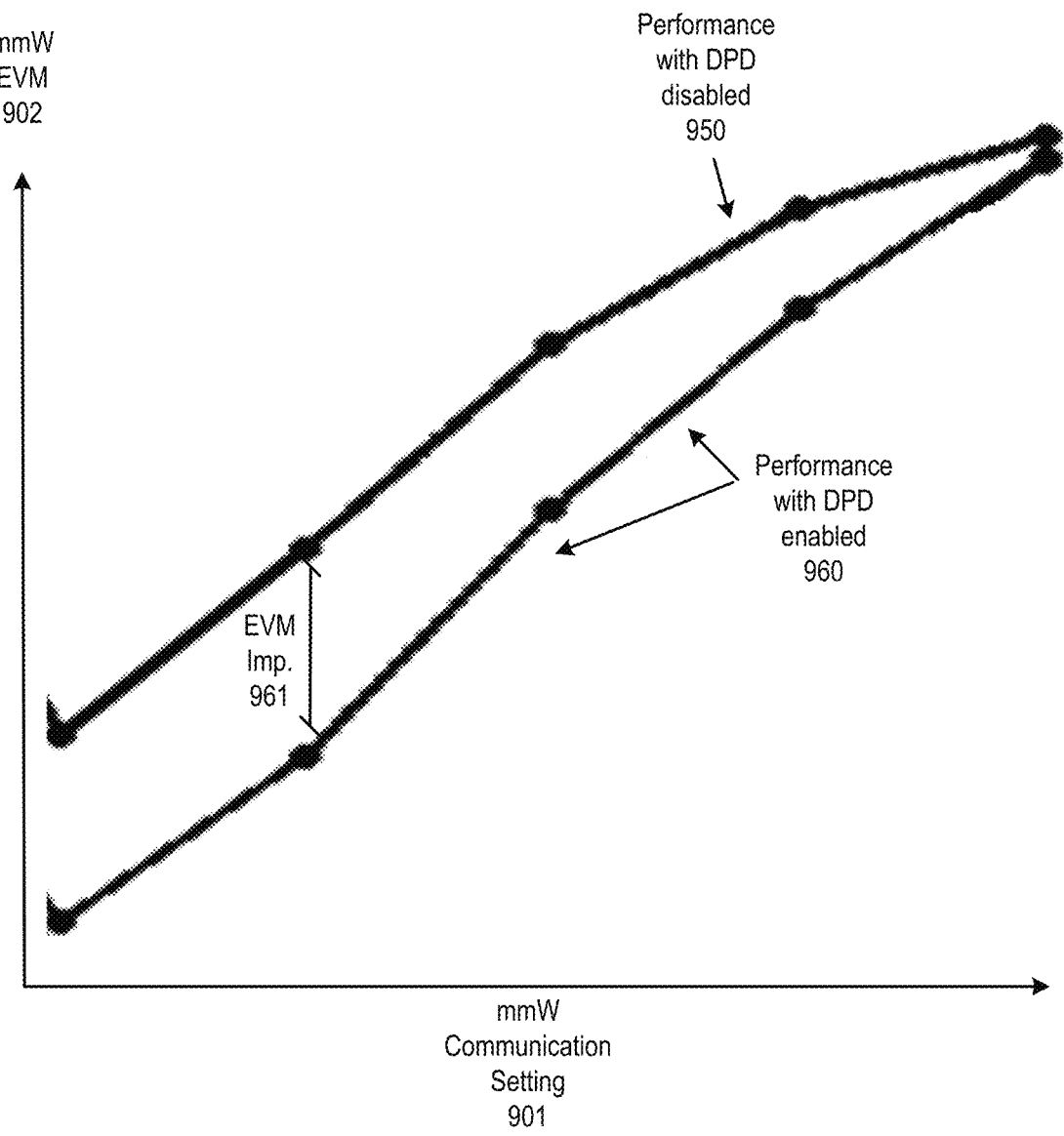
FIG. 9B is a chart showing aspects of mmW communication device performance in accordance with aspects described herein.

FIG. 9A is a chart showing aspects of mmW communication device performance in accordance with aspects described herein. FIG. 9B is a chart showing aspects of mmW communication device performance in accordance with aspects described herein. FIGS. 9A and 9B both illustrate mmW communication settings 901 on the x-axis, and mmW EVM values 902 on the y-axis. Line 910 of FIG. 9A illustrates performance under first conditions with digital predistortion disabled, and lines 920 illustrate performance under the same conditions with digital predistortion enabled using cither path searching with over the air near field loopback or FBRx. FIG. 9A illustrates that similar EVM improvements 921 (e.g., approximately a 5 decibel improvement in EVM performance) are seen with FBRx and the path searching near field loopback in accordance with aspects described herein. Similarly, line 950 of FIG. 9B illustrates performance under second conditions with digital predistortion disabled, and lines 960 illustrate performance with digital predistortion enabled. Similar EVM improvements 961 are seen in both lines 960, using either FBRx or over the air near field path searching in accordance with aspects described herein. As detailed above, over the air near field digital predistortion in accordance with aspects described herein uses fewer components and less space than the added hardware of FBRx, and provides similar performance gains with enabled digital predistortion, thus improving the operation of a mmW communications device operating in accordance with aspects described herein.

Figures 10A, 10B:
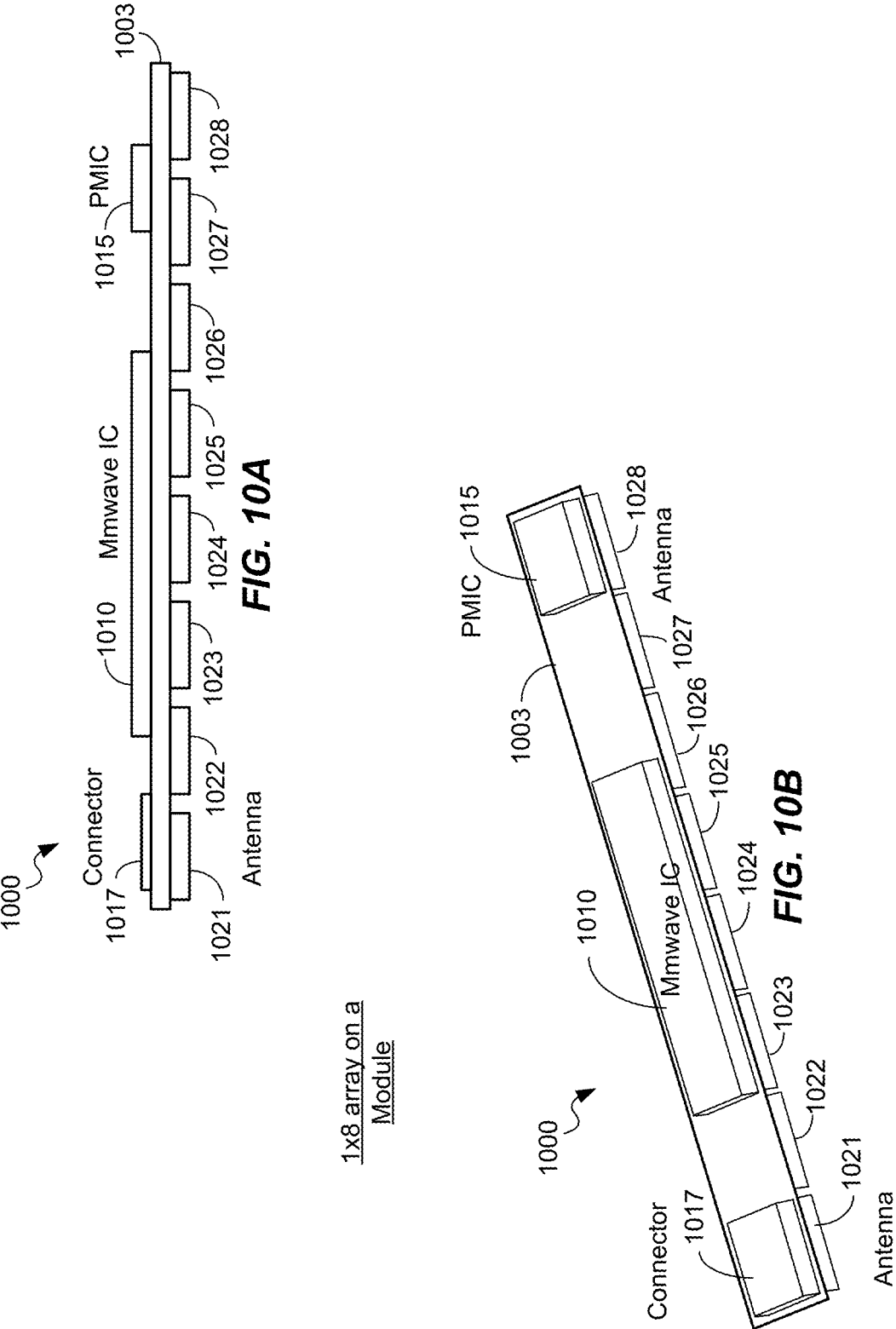
FIGS. 10A, 10B, 10C and 10D are block diagrams illustrating a millimeter wave RF module in accordance with exemplary embodiments of the disclosure.
Figures 10C, 10D:
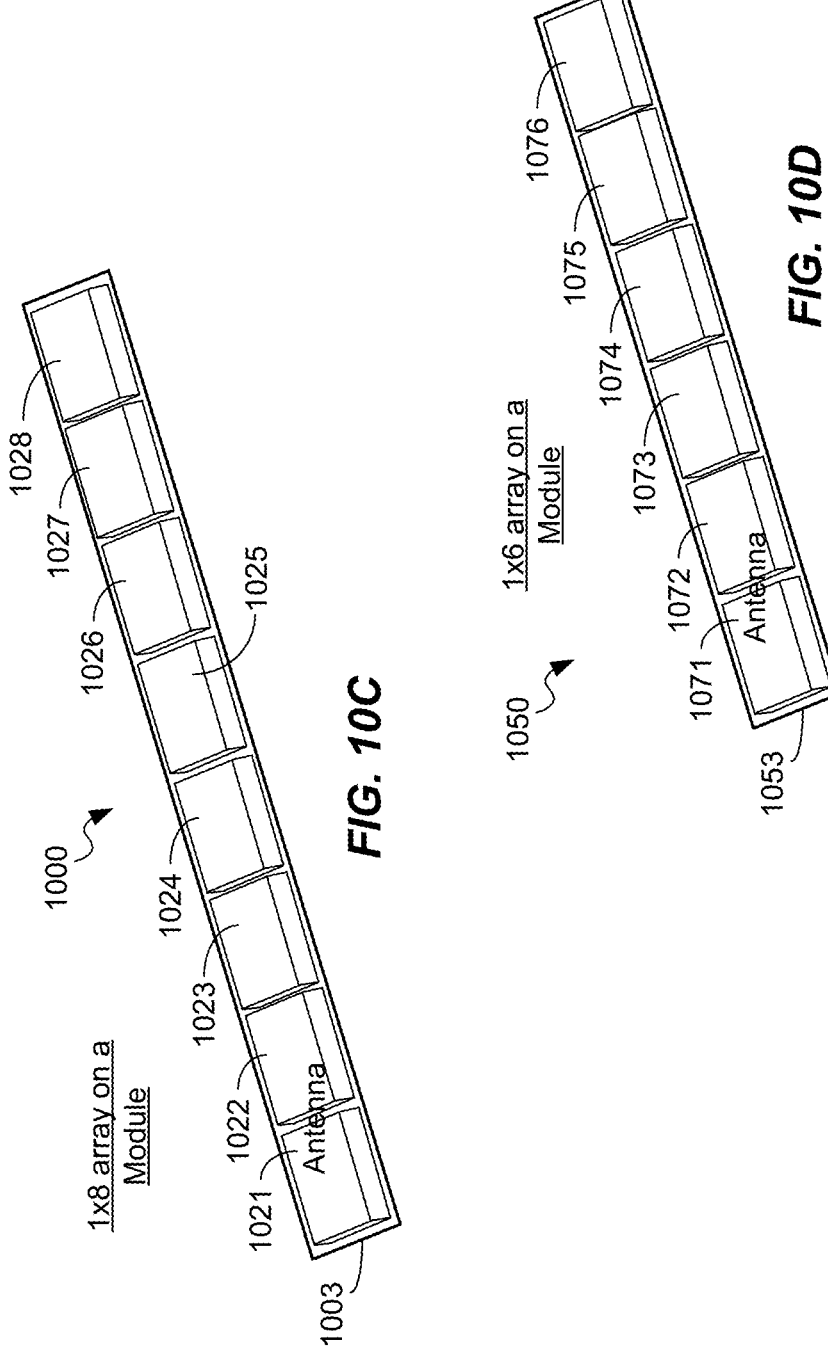

FIGS. 10A, 10B, 10C and 10D are block diagrams illustrating a millimeter wave RF module in accordance with exemplary embodiments of the disclosure. FIGS. 10A, 10B and 10C are block diagrams collectively illustrating an exemplary embodiment of a millimeter wave (mmW) RF module that can implement path searching for mmW digital predistortion calibration in accordance with aspects described herein.

FIG. 10A shows a side view of a millimeter wave (mmW) RF module 1000. The RF module 1000 may be an example of any mmW communication device or a mmW module of a communication device used to implement DPD path searching and calibration as described herein for mmW communications. In an exemplary embodiment, the RF module 1000 may comprise a 1×8 phased array fabricated on a substrate 1003. In an exemplary embodiment, the RF module 1000 may comprise a mmWIC 1010 (which may be an example of the RFIC 530), a PMIC 1015, a connector 1017 and a plurality of antennas 1021, 1022, 1023, 1024, 1025, 1026, 1027 and 1028 fabricated on a substrate 1003 (which may be examples of the antenna elements 552 in the antenna array 550). Such phased array and antenna elements can be used to implement Tx and Rx elements of a mmW device, and control circuitry integrated with the mmW RF module 1000 or coupled to the mmW RF module 1000 can be used to implement path searching for mmW digital predistortion calibration as described herein.

FIG. 10B is a top perspective view of the RF module 1000 showing the mmWIC 1010, a PMIC 1015, a connector 1017 and a plurality of antennas 1021, 1022, 1023, 1024, 1025, 1026, 1027 and 1028 on the substrate 1003.

FIG. 10C is a bottom perspective view of the RF module 1000 showing the antennas 1021, 1022, 1023, 1024, 1025, 1026, 1027 and 1028 on the substrate 1003.

FIG. 10D shows an alternative embodiment of a millimeter wave (mmW) RF module 1050. The RF module 1050 may be similar to the RF module 1000 shown in FIG. 10A, but is arranged as a 1×6 array. In an exemplary embodiment, the RF module 1050 may comprise a 1×6 phased array fabricated on a substrate 1053.

In an exemplary embodiment, the RF module 1050 may comprise a plurality of antennas 1071, 1072, 1073, 1074, 1075 and 1076 (which may be examples of the antenna elements 552 in the antenna array 550) fabricated on the substrate 1053. Those of skill in the art will understand that an RF module may be implemented which includes a greater or fewer number of antennas, and/or that includes antennas in a configuration other than a linear array.

FIG. 11 is a flow diagram describing an example of the operation of a method 1100 for operation of a device including search and selection operations for mmW digital predistortion calibration in accordance with aspects described herein. In some aspects, the operations of the method 1100 can be performed by control circuitry and elements of a mmW communication device as described herein. In some aspects, the operations of the method 1100 can be implemented as instructions stored in a computer readable storage medium that, when executed by processing or control circuitry of a device, cause the device to perform the described operations. The blocks in the method 1100 can be performed in or out of the order shown, and in some embodiments, can be performed at least in part in parallel.

At block 1102 of method 1100, the device implementing the method (or a component thereof) may perform operations including selecting, at a millimeter wave communication device, a first transmission element from a plurality of transmission elements associated with a first antenna element of a plurality of antenna elements in an antenna array of the millimeter wave communication device, wherein the first transmission element is selected based on a gain setting for the first transmission element, and wherein the millimeter wave communication device comprises the plurality of antenna elements, the plurality of transmission elements coupled to the plurality of antenna elements, and a plurality of receive elements coupled to the plurality of antenna elements;

At block 1104 of method 1100, the device implementing the method (or a component thereof) may perform operations including selecting a reference transmission power for a test transmission from the first transmission element as part of a path searching operation of the millimeter wave communication device.

At block 1106 of method 1100, the device implementing the method (or a component thereof) may perform operations including determining a selected receive element of the plurality of receive elements based on a near field power measurement of the reference transmission power from the first transmission element using the selected receive element and a set of selection criteria.

At block 1108 of method 1100, the device implementing the method (or a component thereof) may perform operations including setting a digital predistortion calibration setting using the reference transmission power and the near field power measurement.

FIG. 12 is a functional block diagram of an apparatus including a mmW communication device with searching for mmW digital predistortion calibration as described herein. The apparatus 1200 comprises means 1202 as means for selecting a first transmission element from a plurality of transmission elements, wherein the first transmission element is selected based on a gain setting for the first transmission element. The apparatus 1200 additionally comprises means 1204 as means for selecting a reference transmission power for a test transmission from the first transmission element as part of a path searching operation of the wireless communication apparatus. The apparatus 1200 additionally comprises means 1206 as means for determining a selected receive element of a plurality of receive elements based on a corresponding near field power measurement of the reference transmission power from the first transmission element using the selected receive element and a set of selection criteria. The apparatus 1200 additionally comprises means 1208 as means for setting a digital predistortion calibration setting using the reference transmission power and the corresponding near field power measurement. The circuit architecture described herein may be implemented on one or more ICs, analog ICs. RFICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BICMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

Although selected aspects have been illustrated and described in detail, it will be understood that various substitutions and alterations may be made therein without departing from the spirit and scope of the present invention, as defined by the following claims.

Illustrative aspects of the present disclosure include, but are not limited to:

Aspect 1. A method comprising: selecting a reference transmission power for a path searching operation of a millimeter wave communication device; selecting, at a millimeter wave communication device, a first transmission element from a plurality of transmission elements associated with a first antenna element of a plurality of antenna elements in an antenna array of the millimeter wave communication device, wherein the first transmission element is selected based on a gain setting for the first transmission element, and wherein the millimeter wave communication device comprises the plurality of antenna elements, the plurality of transmission elements coupled to the plurality of antenna elements, and a plurality of receive elements coupled to the plurality of antenna elements; selecting a reference gain state for a plurality of receive elements associated with the plurality of antenna elements in the antenna array other than the first antenna element; measuring a corresponding near field power measurement for each of the plurality of receive elements from a transmission via the first transmission element using the reference transmission power; selecting a reference transmission power for a test transmission from the first transmission element as part of a path searching operation of the millimeter wave communication device; determining a selected receive element of the plurality of receive elements based on a near field power measurement of the reference transmission power from the first transmission element using the selected receive element and a set of selection criteria; and setting a digital predistortion calibration setting using the reference transmission power and the near field power measurement.

Aspect 2. The method of Aspect 1, wherein the digital predistortion calibration setting is further based on a transmission value which is the reference transmission power plus a target transmission power, and a receive power offset value which is a difference between the near field power measurement at the selected receive element and a target receive element power.

Aspect 3. The method of any of Aspects 1 to 2, wherein the set of selection criteria comprises a threshold range and a target power value.

Aspect 4. The method of Aspect 3, wherein determining the selected receive element comprises determining whether a corresponding near field power measurement for any of the plurality of receive elements is within the threshold range.

Aspect 5. The method of Aspect 4, wherein determining the selected receive element comprises selecting the selected receive element with a highest value for the corresponding near field power measurement when no corresponding near field power measurement for any of the plurality of receive elements are within the threshold range.

Aspect 6. The method of Aspect 4, wherein determining the selected receive element comprises selecting the selected receive element with a closest value to the target power value when multiple corresponding near field power measurements are within the threshold range.

Aspect 7. The method of any of Aspects 1 to 6, wherein the reference transmission power is a medium power setting more than a threshold value away from a minimum power setting and a maximum power setting.

Aspect 8. The method of any of Aspects 1 to 7, wherein a corresponding near field power measurement for each of the plurality of receive elements, including the near field power measurement for the selected receive element, is a wide band energy estimator (WBEE) value.

Aspect 9. The method of any of Aspects 1 to 8, further comprising: storing the digital predistortion calibration setting in a memory of a modem; and predistorting a transmission signal generated by the modem using the digital predistortion calibration setting.

Aspect 10. The method of any of Aspects 1 to 9, wherein the gain setting used to select the first transmission element is an intermediate gain setting that avoids poor antenna loading associated with minimum or maximum gain settings.

Aspect 11. The method of any of Aspects 1 to 10, wherein the gain setting is a medium gain setting relative to maximum and or minimum gain settings for the plurality of antenna elements.

Aspect 12. The method of any of Aspects 1 to 11, further comprising: performing a transmission amplitude mismatch calibration for each element of the plurality of transmission elements; and selecting the first transmission element using results of the transmission amplitude mismatch calibration.

Aspect 13. The method of Aspect 12, wherein the transmission amplitude mismatch calibration comprises: configuring each transmission element of the plurality of transmission elements with a standard gain setting; and measuring an output power for each transmission element of the plurality of transmission elements.

Aspect 14. The method of any of Aspects 1 to 13, wherein the selected receive element is selected by: selecting a reference gain state for the plurality of receive elements associated with the plurality of antenna elements in the antenna array other than the first antenna element; and measuring a corresponding near field power measurement for each of the plurality of receive elements from a transmission via the first transmission element using the reference transmission power.

Aspect 15. The method of any of Aspects 1 to 14, further comprising performing a near field loopback test using the first transmission element and the selected receive element configured with the digital predistortion calibration setting to generate transmission predistortion settings using a modem of the millimeter wave communication device.

Aspect 16. The method of Aspect 15, further comprising generating a transmission signal; modifying the transmission signal using the digital transmission predistortion settings; and transmitting the transmission signal using the antenna array.

Aspect 17. The method of any of Aspects 1 to 16, further comprising: selecting an initial transmission element based on a gain setting for the initial transmission element; selecting the reference transmission power for an initial test transmission from the initial transmission element as part of the path searching operation of the millimeter wave communication device; determining that no receive element of the plurality of receive elements meets a measurement threshold based on near field power measurements of the reference transmission power from the initial transmission element; and selecting the transmission element after determining that no receive element of the plurality of receive elements meets the measurement threshold.

Aspect 18. A millimeter wave communication device, comprising: an antenna array comprising a plurality of antenna elements; a plurality of transmission elements, wherein each transmission element is coupled to a corresponding antenna element of the plurality of antenna elements; a plurality of receive elements, wherein each receive element is coupled to an associated antenna element of the plurality of antenna elements; and control circuitry coupled to the plurality of transmission elements and the plurality of receive elements, the control circuitry configurable to perform operations including: selecting, at the millimeter wave communication device, a first transmission element from the plurality of transmission elements, wherein the first transmission element is selected based on a gain setting for the first transmission element; selecting a reference transmission power for a test transmission from the first transmission element as part of a path searching operation of the millimeter wave communication device; determining a selected receive element of the plurality of receive elements based on a corresponding near field power measurement of the reference transmission power from the first transmission element using the selected receive element and a set of selection criteria; and setting a digital predistortion calibration setting using the reference transmission power and the corresponding near field power measurement.

Aspect 19. The millimeter wave communication device of Aspect 18, wherein the digital predistortion calibration setting is further based on a transmission value which is the reference transmission power plus a target transmission power, and a receive power offset value which is a difference between the corresponding near field power measurement of the selected receive element and a target receive element power.

Aspect 20. The millimeter wave communication device of any of Aspects 18 to 19, wherein the corresponding near field power measurement for each of the plurality of receive elements is a wide band energy estimator (WBEE) value.

Aspect 21. The millimeter wave communication device of Aspect 20, further comprising a phase shifter coupled between the plurality of transmission elements and the plurality of antenna elements, wherein the phase shifter is configurable to generate transmission beams from a transmission signal predistorted using predistortion settings generated using the digital predistortion calibration setting.

Aspect 22. The millimeter wave communication of Aspect 21, further comprising: one or more processors; a memory coupled to the one or more processors; a display screen coupled to the one or more processors; and a modem coupled to the one or more processors, wherein the modem comprises the control circuitry.

Aspect 23. The millimeter wave communication of Aspect 21, wherein the set of selection criteria comprises a threshold range and a target power value.

Aspect 24. The millimeter wave communication device of any of Aspects 18 to 23, wherein determining the selected receive element comprises determining whether the corresponding near field power measurement for any of the plurality of receive elements is within the threshold range.

Aspect 25. The millimeter wave communication device of any of Aspects 18 to 24, wherein determining the selected receive element comprises selecting the selected receive element with a highest value for the corresponding near field power measurement when no corresponding near field power measurement for any of the plurality of receive elements are within the threshold range.

Aspect 26. The millimeter wave communication device of any of Aspects 18 to 25, wherein determining the selected receive element comprises selecting the selected receive element with a closest value to the target power value when multiple corresponding near field power measurements are within the threshold range.

Aspect 27. A computer readable storage medium comprising instructions that, when executed by control circuitry of a millimeter wave communication device, causes the millimeter wave communication device to perform operations comprising: selecting, at the millimeter wave communication device, a first transmission element from a plurality of transmission elements, wherein the first transmission element is selected based on a gain setting for the first transmission element; selecting a reference transmission power for a test transmission from the first transmission element as part of a path searching operation of the millimeter wave communication device; determining a selected receive element of the plurality of receive elements based on a corresponding near field power measurement of the reference transmission power from the first transmission element using the selected receive element and a set of selection criteria; and setting a digital predistortion calibration setting using the reference transmission power and the corresponding near field power measurement.

Aspect 28. The computer readable storage medium of Aspect 27, wherein the instructions further cause the millimeter wave communication device to perform operations comprising: storing the digital predistortion calibration setting in a memory of a modem; and predistorting a transmission signal generated by the modem using the digital predistortion calibration setting.

Aspect 29. A wireless communication apparatus comprising: means for selecting a first transmission element from a plurality of transmission elements, wherein the first transmission element is selected based on a gain setting for the first transmission element; means for selecting a reference transmission power for a test transmission from the first transmission element as part of a path searching operation of the wireless communication apparatus; means for determining a selected receive element of a plurality of receive elements based on a corresponding near field power measurement of the reference transmission power from the first transmission element using the selected receive element and a set of selection criteria; and means for setting a digital predistortion calibration setting using the reference transmission power and the corresponding near field power measurement.

Aspect 30. The wireless communication apparatus of Aspect 29, further comprising: means for storing the digital predistortion calibration setting; means for generating a millimeter wave transmission signal; means for predistorting the millimeter wave transmission signal to generate a predistorted millimeter wave transmission signal; and means for transmitting the predistorted millimeter wave transmission signal.

Aspect 31. A method of operating a wireless communication apparatus in accordance with any Aspect above.

Aspect 32. A device comprising means for performing any operation described above.

Aspect 33. A storage medium comprising instructions that, when executed by circuitry of a device, cause the device to perform any operations described above.

What is claimed is:

1. A method comprising:
selecting, at a millimeter wave communication device, a first transmission element from a plurality of transmission elements associated with a first antenna element of a plurality of antenna elements in an antenna array of the millimeter wave communication device, wherein the first transmission element is selected based on a gain setting for the first transmission element, and wherein the millimeter wave communication device comprises the plurality of antenna elements, the plurality of transmission elements coupled to the plurality of antenna elements, and a plurality of receive elements coupled to the plurality of antenna elements;
selecting a reference transmission power for a test transmission from the first transmission element as part of a path searching operation of the millimeter wave communication device;
determining a selected receive element of the plurality of receive elements based on a near field power measurement of the reference transmission power from the first transmission element using the selected receive element and a set of selection criteria; and
setting a digital predistortion calibration setting using the reference transmission power and the near field power measurement.

2. The method of claim 1, wherein the digital predistortion calibration setting is further based on a transmission value which is the reference transmission power plus a target transmission power, and a receive power offset value which is a difference between the near field power measurement at the selected receive element and a target receive element power.

3. The method of claim 1, wherein the set of selection criteria comprises a threshold range and a target power value.

4. The method of claim 3, wherein determining the selected receive element comprises determining whether a corresponding near field power measurement for any of the plurality of receive elements is within the threshold range.

5. The method of claim 4, wherein determining the selected receive element comprises selecting the selected receive element with a highest value for the corresponding near field power measurement when no corresponding near field power measurement for any of the plurality of receive elements are within the threshold range.

6. The method of claim 4, wherein determining the selected receive element comprises selecting the selected receive element with a closest value to the target power value when multiple corresponding near field power measurements are within the threshold range.

7. The method of claim 1, wherein the reference transmission power is a medium power setting more than a threshold value away from a minimum power setting and a maximum power setting.

8. The method of claim 1, wherein a corresponding near field power measurement for each of the plurality of receive elements, including the near field power measurement for the selected receive element, is a wide band energy estimator (WBEE) value.

9. The method of claim 1, further comprising:

storing the digital predistortion calibration setting in a memory of a modem; and predistorting a transmission signal generated by the modem using the digital predistortion calibration setting.

10. The method of claim 1, wherein the gain setting used to select the first transmission element is an intermediate gain setting that avoids poor antenna loading associated with minimum or maximum gain settings.

11. The method of claim 1, wherein the gain setting is a medium gain setting relative to maximum and or minimum gain settings for the plurality of antenna elements.

12. The method of claim 1, further comprising:

performing a transmission amplitude mismatch calibration for each element of the plurality of transmission elements; and selecting the first transmission element using results of the transmission amplitude mismatch calibration.

13. The method of claim 12, wherein the transmission amplitude mismatch calibration comprises:

configuring each transmission element of the plurality of transmission elements with a standard gain setting; and measuring an output power for each transmission element of the plurality of transmission elements.

14. The method of claim 1, wherein the selected receive element is selected by:

selecting a reference gain state for the plurality of receive elements associated with the plurality of antenna elements in the antenna array other than the first antenna element; and measuring a corresponding near field power measurement for each of the plurality of receive elements from a transmission via the first transmission element using the reference transmission power.

15. The method of claim 1, further comprising performing a near field loopback test using the first transmission element and the selected receive element configured with the digital predistortion calibration setting to generate transmission predistortion settings using a modem of the millimeter wave communication device.

16. The method of claim 15, further comprising generating a transmission signal;

modifying the transmission signal using the digital transmission predistortion settings; and transmitting the transmission signal using the antenna array.

17. The method of claim 1, further comprising:

selecting an initial transmission element based on a gain setting for the initial transmission element;

selecting the reference transmission power for an initial test transmission from the initial transmission element as part of the path searching operation of the millimeter wave communication device;

determining that no receive element of the plurality of receive elements meets a measurement threshold based on near field power measurements of the reference transmission power from the initial transmission element; and selecting the transmission element after determining that no receive element of the plurality of receive elements meets the measurement threshold.

18. A millimeter wave communication device, comprising:

an antenna array comprising a plurality of antenna elements;

a plurality of transmission elements, wherein each transmission element is coupled to a corresponding antenna element of the plurality of antenna elements;

a plurality of receive elements, wherein each receive element is coupled to an associated antenna element of the plurality of antenna elements; and control circuitry coupled to the plurality of transmission elements and the plurality of receive elements, the control circuitry configurable to perform operations including:

selecting, at the millimeter wave communication device, a first transmission element from the plurality of transmission elements, wherein the first transmission element is selected based on a gain setting for the first transmission element;

selecting a reference transmission power for a test transmission from the first transmission element as part of a path searching operation of the millimeter wave communication device;

determining a selected receive element of the plurality of receive elements based on a corresponding near field power measurement of the reference transmission power from the first transmission element using the selected receive element and a set of selection criteria; and setting a digital predistortion calibration setting using the reference transmission power and the corresponding near field power measurement.

19. The millimeter wave communication device of claim 18, wherein the digital predistortion calibration setting is further based on a transmission value which is the reference transmission power plus a target transmission power, and a receive power offset value which is a difference between the corresponding near field power measurement of the selected receive element and a target receive element power.

20. The millimeter wave communication device of claim 18, wherein the set of selection criteria comprises a threshold range and a target power value.

21. The millimeter wave communication device of claim 20, wherein determining the selected receive element comprises determining whether the corresponding near field power measurement for any of the plurality of receive elements is within the threshold range.

22. The millimeter wave communication device of claim 21, wherein determining the selected receive element comprises selecting the selected receive element with a highest value for the corresponding near field power measurement when no corresponding near field power measurement for any of the plurality of receive elements are within the threshold range.

23. The millimeter wave communication device of claim 21, wherein determining the selected receive element comprises selecting the selected receive element with a closest value to the target power value when multiple corresponding near field power measurements are within the threshold range.

24. The millimeter wave communication device of claim 18, wherein the corresponding near field power measurement for each of the plurality of receive elements is a wide band energy estimator (WBEE) value.

25. The millimeter wave communication device of claim 18, further comprising a phase shifter coupled between the plurality of transmission elements and the plurality of antenna elements, wherein the phase shifter is configurable to generate transmission beams from a transmission signal predistorted using predistortion settings generated using the digital predistortion calibration setting.

26. The millimeter wave communication device of claim 18, further comprising:
    one or more processors;
    a memory coupled to the one or more processors; and
    a modem coupled to the one or more processors, wherein the modem comprises the control circuitry.

27. A non-transitory computer readable storage medium comprising instructions that, when executed by control circuitry of a millimeter wave communication device, causes the millimeter wave communication device to perform operations comprising:
    selecting, at the millimeter wave communication device, a first transmission element from a plurality of transmission elements, wherein the first transmission element is selected based on a gain setting for the first transmission element;
    selecting a reference transmission power for a test transmission from the first transmission element as part of a path searching operation of the millimeter wave communication device;
    determining a selected receive element of a plurality of receive elements based on a corresponding near field power measurement of the reference transmission power from the first transmission element using the selected receive element and a set of selection criteria; and
    setting a digital predistortion calibration setting using the reference transmission power and the corresponding near field power measurement.

28. The non-transitory computer readable storage medium of claim 27, wherein the instructions further cause the millimeter wave communication device to perform operations comprising:

30 storing the digital predistortion calibration setting in a memory of a modem; and
predistorting a transmission signal generated by the modem using the digital predistortion calibration setting.

29. A wireless communication apparatus comprising:
means for selecting a first transmission element from a plurality of transmission elements, wherein the first transmission element is selected based on a gain setting for the first transmission element;
means for selecting a reference transmission power for a test transmission from the first transmission element as part of a path searching operation of the wireless communication apparatus;
means for determining a selected receive element of a plurality of receive elements based on a corresponding near field power measurement of the reference transmission power from the first transmission element using the selected receive element and a set of selection criteria; and
means for setting a digital predistortion calibration setting using the reference transmission power and the corresponding near field power measurement.

30. The wireless communication apparatus of claim 29, further comprising:
means for storing the digital predistortion calibration setting;
means for generating a millimeter wave transmission signal;
means for predistorting the millimeter wave transmission signal to generate a predistorted millimeter wave transmission signal; and
means for transmitting the predistorted millimeter wave transmission signal.

* * * * *